United States Patent
Mühlschlegel et al.

(10) Patent No.: US 12,538,401 B2
(45) Date of Patent: Jan. 27, 2026

(54) TWO-STAGE OPERATING DEVICE WITH AN ISOLATABLE CLOCKED CONVERTER AS A POWER FACTOR CORRECTOR AND CONTROL METHOD FOR THE OPERATING DEVICE

(71) Applicant: Inventronics GmbH, Garching (DE)

(72) Inventors: Joachim Mühlschlegel, Groebenzell (DE); Maximilian Schmidl, Pullach (DE); Markus Heckmann, Munich (DE)

(73) Assignee: INVENTRONICS GMBH, Garching (DE)

( * ) Notice: Subject to any disclaimer, the term of this patent is extended or adjusted under 35 U.S.C. 154(b) by 54 days.

(21) Appl. No.: 18/729,180

(22) PCT Filed: Oct. 28, 2022

(86) PCT No.: PCT/EP2022/080192
§ 371 (c)(1),
(2) Date: Jul. 16, 2024

(87) PCT Pub. No.: WO2023/134892
PCT Pub. Date: Jul. 20, 2023

(65) Prior Publication Data
US 2025/0113421 A1    Apr. 3, 2025

(30) Foreign Application Priority Data
Jan. 17, 2022   (DE) .................... 10 2022 200 429.9

(51) Int. Cl.
*H05B 45/36*    (2020.01)
*H05B 45/375*   (2020.01)
*H05B 45/395*   (2020.01)

(52) U.S. Cl.
CPC .......... *H05B 45/36* (2020.01); *H05B 45/375* (2020.01); *H05B 45/395* (2020.01)

(58) Field of Classification Search
CPC ...... H05B 45/38; H05B 45/382; H05B 45/39; H05B 45/10; H05B 45/3725; H05B 45/36;
(Continued)

(56) References Cited

U.S. PATENT DOCUMENTS

2003/0227265 A1   12/2003   Biebl
2008/0018261 A1   1/2008    Kastner
(Continued)

FOREIGN PATENT DOCUMENTS

DE    202012102882 U1   11/2012
DE    102014205469 A1    9/2015
(Continued)

OTHER PUBLICATIONS

International Search Report issued for the corresponding PCT patent application No. PCT/EP2022/080192, dated Jan. 31, 2023, 3 pages (For informational purposes only).
(Continued)

*Primary Examiner* — Wei (Victor) Y Chan
(74) *Attorney, Agent, or Firm* — VIERING, JENTSCHURA & PARTNER mbB

(57) ABSTRACT

A circuit for an operating device includes a first clocked converter as a power factor corrector and a buck post-regulator, which has a SELV barrier or galvanic isolation barrier extending through the power factor corrector. The power factor corrector has a control circuit concentrated on the input side, which is provided for supplying power from a conventional AC power supply network, and data thereof is to be transmitted, via two optocouplers, for a complete logic link between the input and output side. The output side
(Continued)

is configured to connect to a DC load, in particular an LED or a series circuit of multiple LEDs, provided for general lighting technology. Both optocouplers can be operated digitally, e.g., in a pulsed manner, to compensate for their non-linearity, temperature drift, aging and noise.

18 Claims, 10 Drawing Sheets

(58) Field of Classification Search
CPC .... H05B 45/385; H05B 45/14; H05B 45/375; H05B 47/16; H05B 45/355; H05B 45/59; H05B 45/347; H05B 45/37; H05B 47/19; H05B 45/18
See application file for complete search history.

(56) References Cited

U.S. PATENT DOCUMENTS

| | | |
|---|---|---|
| 2012/0081016 A1 | 4/2012 | Wu et al. |
| 2013/0113381 A1 | 5/2013 | Cai et al. |
| 2013/0162158 A1 | 6/2013 | Pollischansky |
| 2020/0187328 A1 | 6/2020 | Chen et al. |
| 2021/0392729 A1* | 12/2021 | Zheng ............... H05B 45/10 |
| 2022/0046775 A1* | 2/2022 | Archer ............... H05B 45/14 |
| 2024/0365457 A1* | 10/2024 | Wu .................... H05B 47/183 |

FOREIGN PATENT DOCUMENTS

| | | |
|---|---|---|
| DE | 102014218422 A1 | 3/2016 |
| EP | 1372359 B1 | 12/2003 |
| EP | 2315497 A1 | 4/2011 |
| EP | 3471512 A1 | 4/2019 |
| WO | 2012028396 A1 | 3/2012 |
| WO | 2012119244 A1 | 9/2012 |

OTHER PUBLICATIONS

German Search Report issued for the corresponding DE patent application No. DE 10 2022 200 429.9, dated Sep. 7, 2022, 6 pages (For informational purposes only).

* cited by examiner

TWO-STAGE OPERATING DEVICE WITH AN ISOLATABLE CLOCKED CONVERTER AS A POWER FACTOR CORRECTOR AND CONTROL METHOD FOR THE OPERATING DEVICE

CROSS-REFERENCE TO RELATED APPLICATIONS

This application is a U.S. National Stage of International Application No. PCT/EP2022/080192, filed on Oct. 28, 2022, and claims priority under 35 U.S.C. § 119(a) and 35 U.S.C. § 365(b) from German Patent Application No. 10 2022 200 429.9, filed on Jan. 17, 2022: the disclosures of which are incorporated herein by reference.

TECHNICAL FIELD

The present disclosure relates to a circuit arrangement for operating a load which only requires a headroom voltage of a post-regulator as a feedback signal for setting a load current.

BACKGROUND

Clocked converters are widely used as power factor correctors which are obligatory in lighting technology from a single input power of 5 W and, for example, in entertainment and computer technology from a single input power of 80 W. The output poles of such a power factor corrector which may also be referred to as an input stage, are in most cases connected by a large intermediate circuit capacitor in which a DC supply voltage is buffered for subsequent switching stages or directly for a load, which is also called intermediate circuit voltage. Buffering is essential because, in principle, the power factor corrector as the input stage only supplies such recharging currents for the intermediate circuit capacitor that are fully modulated and pulsate at twice the frequency of an AC power supply network, i.e. that even have zero points at this double mains frequency. The result of this is a so-called mains hum on the DC supply voltage buffered in the intermediate circuit capacitor with twice the mains frequency, i.e. in the case of a mains frequency of 50 Hz, a mains hum with 100 Hz, unless the intermediate circuit capacitor has a virtually infinite capacitance, such as that found in "super caps" or accumulators, for example. Electrolytic capacitors or large film capacitors of finite capacitance, used as standard intermediate circuit capacitors, are therefore confronted with the above-mentioned mains hum, which is superimposed on a DC supply voltage or intermediate circuit voltage, and for which they must also be designed. The lower the capacitance of an intermediate circuit capacitor compared to the current drawn, the higher the amplitude of the mains hum. In a higher-level device considered herein, a first clocked converter is therefore always the input stage, which is terminated by the intermediate circuit capacitor and which produces and maintains an intermediate circuit voltage thereat.

Power factor correctors as input stages often have the property of building up intermediate circuit voltages that are higher than the voltage peak values of the associated AC power supply network. In the case of a conventional 230 V mains voltage, intermediate circuit voltages or DC supply voltages of at least 400 V often result. These voltages are too high for many loads, in particular those with low power. Therefore, more and more clocked converters are being used as power factor-correcting input stages, which can also produce and maintain smaller intermediate circuit voltages. Four such topologies for clocked converters are known from the literature, comprising only one active power transistor and only one fast power diode: The choke buck-boost converter, the Ćuk converter, the Zeta converter and the SEPIC (Single-Ended Primary Inductor Converter). The first two, at least in their non-insulating original form, have the problem that their respective output voltage, i.e. the intermediate circuit voltage, is negatively built up in relation to a circuit ground that passes between input and output. Or a choke buck-boost converter can be constructed such that its output voltage is positive, but the ground on the output side is on the positive pole of its input voltage, so the output voltage figuratively "rides on the input voltage". In short, with the choke buck-boost converter and the Ćuk converter, either the output voltage is negative or the ground "does not pass through".

This problem is solved in the other two topologies above. The SEPIC was therefore developed from a Ćuk converter in order to combine its advantages—an input inductance that is particularly advantageous for power factor correctors and the freely selectable level of the output voltage—with a circuit ground passing through and a positive output voltage. As each SEPIC requires a capacitive termination, which is provided by the intermediate circuit capacitor anyway, this converter topology is particularly suitable as a voltage level-free power factor corrector. The choke buck-boost converter can only be correctly polarized on the output side by replacing its inverting inductor with a reverse-coupled transformer, resulting in the widely known flyback converter. Although it does not comprise an input inductance, this is also suitable as a voltage-free power factor corrector and is also the most commonly used in this function or as the first clocked converter due to its minimal number of components and its equally good suitability for recharging an intermediate circuit capacitor. Due to its output inductance, a Ćuk converter as a power factor-correcting input stage is particularly suitable for loads that require a current intermediate circuit instead of a voltage intermediate circuit, for example for discharge lamps, for welding equipment or for electric drives, and is therefore not suitable as an input stage here. A Zeta converter has this same limitation and in addition has no inductance at its input, which is why it cannot be considered as an input stage or power factor corrector or first clocked converter. This is because it is just as complicated as a SEPIC or a Ćuk converter and therefore, for lack of advantages, only combines their disadvantages.

Regardless of the voltage intermediate circuit or current intermediate circuit and regardless of the polarity of the output voltage, the above four converter topologies for voltage level-free outputs have the further immense advantage that they can be galvanically isolated between their input and output by means of an isolation transformer. The flyback converter, which, as mentioned above, is created by isolation from a choke buck-boost converter, illustrates the principle: The inductor with ground connection in the original form of the converter topology is replaced by the transformer, whereby the ground connection is separated. In a SEPIC, its storage inductance connected to ground on the output side is replaced by the isolation transformer: in a Zeta converter, the same would happen with its storage inductance on the input side. A Ćuk converter can only be isolated by splitting its internal capacitor and inserting a transformer in between, which is complicated but has the enormous advantage that the isolation transformer is only loaded with pure alternating current on both sides. It therefore does not require an air gap. All this has recently led to a significant shift in tasks between the input stage and a post-regulator within a higher-level device, in particular when a galvanic isolation barrier has to extend through the entire higher-level device. Whereas the post-regulator used to be mainly responsible for this barrier, which then often has to be elaborately designed as a full or half bridge or as a Zeta converter, it is now increasingly the responsibility of the power factor correcting input stage or the first clocked converter.

In addition to the power required for an electrical load, for which the topology of the first clocked converter is responsible, various measurement signals must also be transmitted as analog data via the same isolation barrier. It is further recommended to concentrate all the logic for a higher-level device on one side of this barrier.

Traditionally, this side is the output side of a higher-level device to which its electrical load is connected. This is because the parameters of this load must be measured constantly and in real time in order to be able to control one of them at a time, and the resulting control signals for the at least one power transistor of a clocked converter, which is always located on the input side, can be easily transmitted via a galvanic barrier because as a matter of principle they are pulse-shaped.

However, with active power factor correction using the first clocked converter described above, measurements must also be taken on the input side of a higher-level device to which the AC power supply network is connected. For this purpose, at least part of the logic can also be required there, which means that isolating higher-level devices often have two logic centers, one for active power factor correction on its input side and a second for load control and monitoring on its output side. The problem with this is that a logic link is often only possible via the current intermediate circuit voltage if the transmission of further logic signals is to be avoided. Such a stripped-down logic link proves to be inadequate for highly dynamic operation or for data networking of a higher-level device in particular. The current trend is therefore to concentrate the control on the input side of a higher-level device so that this control can also completely take over the control of the power factor correction, while at the same time avoiding complex analog data transmissions across the isolation barrier. With the migration of a galvanic isolation barrier into the power factor corrector, the concentrated control circuit often migrates to the input side of a higher-level device.

This higher-level device comprising the specified circuit arrangement can be, inter alia, a wall plug transformer, a simple power supply, a switched-mode power supply, a laboratory power supply, a direct current converter, a DC-DC converter, an active current source, an active voltage source or another operating device, e.g. for light sources. From now on, as already mentioned at the beginning, when a higher-level device is meant, only an operating device is referred to.

Its electrical load here consists in particular of a series circuit of multiple LEDs provided for general lighting technology.

The more precisely this electrical load is characterized, the further an operating device provided for it can be optimized. In the case specified here, the load, which in this case consists of LEDs, impresses an approximately ideal constant output voltage, and a post-regulator between this load and the intermediate circuit capacitor must bridge the difference between the intermediate circuit voltage and the permanently impressed output voltage such that an output current, which is also the load current through the at least one LED, can flow through it continuously and, in particular, without gaps. The simplest "post-regulator" is an ohmic resistor connected to the intermediate circuit capacitor in series with the load. To achieve this, the intermediate circuit voltage must always be higher than the output voltage, otherwise there would be gaps in the load current. This is because the mains hum is also a component of the above voltage difference, which, as already mentioned above, is also referred to as headroom, and the load current in this ohmic series resistor as a post-regulator has at least the same relative ripple as the mains hum in relation to the time average of the intermediate circuit voltage, but usually a significantly higher one. This problem is solved by replacing the ohmic series resistor with a linear regulator, which keeps the output current constant regardless of the voltage difference, which therefore has an almost infinitely high differential series resistance as long as it can actively regulate. Here too, the intermediate circuit voltage must always be higher than the output voltage, said headroom must therefore never become negative. A headroom equal to zero or a non-existent head room leads to an interruption of the active regulation of the mains hum in order to maintain a constant output current via the linear regulator as a post-regulator, which then acts as a rigid and low impedance connection from the intermediate circuit capacitor to the output of the operating device. Then advantageously a smaller output current flows, which is defined by a first-order low-pass filter formed from the point of view of the LED load by the capacitance of the intermediate circuit capacitor and the differential resistance of all LEDs involved, increased by a current measuring resistor. This low-pass filter can only passively filter the sinusoidal charging current for the intermediate circuit capacitor thanks to power factor correction and can no longer actively control it, so that without any headroom the ripple of the output current through the at least one LED increases noticeably. With an ohmic series resistor as a "post-regulator", this ripple would be even higher because without any headroom it would simply no longer allow any load current to flow through the at least one LED.

Both post-regulators mentioned so far generate high losses, which depend on the level of the required output current on the one hand and on the level of the headroom on the other. It follows that this headroom should always be positive, but only as high as is necessary at any given time. This optimization or minimization of headroom, also known as "headroom control", is the subject of countless patent applications, such as EP 1-372-359 B1. A mitigation of the loss problem to the effect that the headroom becomes zero or dries up in sections and periodically, wherein the post-regulator interrupts its activity in sections, allows the output current to pass unregulated and thus smaller than desired and does not generate any losses in the meantime, is disclosed, for example, in DE 10-2014-205-469 A1 and in DE 10-2014-218-422 A1. The disadvantage of the solutions there is that the ratio of time periods with headroom to those without, or in other words the level of load current ripple, is designed into the operating device via component values, and in particular that it or they always have a significant level and cannot be close to zero.

If a second clocked converter is used as a post-regulator instead of a series resistor or a linear regulator, the loss problem is almost completely eliminated and the control of the headroom is simplified. This is because the need to minimize it no longer applies, and only the requirement for an always positive headroom remains if the second clocked converter is a buck converter. Because a boost converter does not make sense as a post-regulator, and because a buck converter is the only one of the five remaining clocked converters that seemingly behaves like a linear regulator, in particular without any headroom and thus without clocking its power transistor, the post-regulator-if clocked—is always formed by a buck converter.

Numerous studies have shown that the loss-optimizing effect of minimizing the headroom always outweighs the opposing effect of reducing the current in the intermediate circuit capacitor by increasing its voltage and thus also any headroom. Only in the marginal case of small intermediate circuit voltages, e.g. below 10 V, it may be more advantageous to slightly increase the headroom in order to slightly reduce the currents in the intermediate circuit capacitor at constant power due to the resulting overall higher intermediate circuit voltage.

SUMMARY

Various embodiments relate to a circuit arrangement for operating a load which only requires a headroom voltage of a post-regulator as a feedback signal for setting a load current. An operating device comprising the circuit arrangement, which is provided for the energy supply and control of LEDs for general lighting technology, comprises an isolatable first clocked converter as a power factor corrector and the post-regulator connected thereto and supplied thereby, which in turn supplies the at least one LED with the necessary energy as its load. To enable its activity, the post-regulator has a headroom between an intermediate circuit voltage and an output voltage, which headroom may also include a mains hum. The output voltage corresponds to the forward voltage of at least one LED connected to the operating device or the sum of the forward voltages of all connected LEDs if, as is usually the case, they are connected in series, and the intermediate circuit voltage is the output voltage of the power factor corrector, which is usually higher than the forward voltage and can be equally high during certain points in time or time periods. The headroom then runs dry and the post-regulator is inactive. The main object of the post-regulator is to regulate the mains hum. Therefore, on the output side of the operating device, it comprises an analog current controller whose setpoint is transmitted in pulsed form via a first optocoupler. A second optocoupler transmits binary information as to whether the headroom is larger or smaller than a fixed limit from the output side back to the input side of the operating device, on which a control circuit is located. This not only provides feedback on the output voltage at specific points, since the fixed limit and the intermediate circuit voltage are known, but also the activity of the post-regulator as such by means of the presence of the headroom. In the event of overtemperature, the time periods with available headroom are shortened, which means that the post-regulator remains inactive for longer and the output current is of course reduced in order to protect the operating device. Further protection for the operating device is provided by the reduction of losses in the post-regulator. The post-regulator can be designed as a linear regulator or as a second clocked converter, particularly advantageously as a buck converter. Particularly good cooling of the output side can shift an overtemperature threshold to higher temperatures.

Various embodiments of the present disclosure relate to a circuit and an associated control method for an operating device which comprises a first clocked converter as power factor corrector and a buck post-regulator, which has a galvanic isolation barrier or SELV barrier extending through the power factor corrector, which has a control circuit concentrated on its input side, which is provided for supplying power from a conventional AC power supply network, and whose data for a complete logic link between input and output side are to be transmitted only via two optocouplers. The output side is designed for connecting to a DC load, in particular an LED or a series circuit of multiple LEDs, provided for general lighting technology. Both optocouplers are to be operated digitally, i.e. in a pulsed manner, in order to compensate for their non-linearity, temperature drift, aging and noise.

SELV barrier means an insulation between the primary side and the secondary side of the clocked converter, usually with a transformer, which prevents contact with parts carrying mains voltage. Since heat sinks for LED loads in particular often have a certain potential in the circuit operating them, compliance with the criteria for safety extra low voltage in accordance with DIN EN 61140 (VDE 0140-1) is mandatory in such cases. The German term "Sicherheitsschutzkleinspannung" is called "Safety Extra Low Voltage" (SELV) in English.

A first optocoupler transmits from the input to the output side, a second one in the opposite direction. On its output side, the operating device should comprise an analog current controller so that only the setpoint for the output current needs to be transmitted via the first optocoupler. The control of the headroom from the intermediate circuit voltage to the output voltage should be linked to the retransmission of the output voltage as a "load=OK signal", and the head room should vary depending on the temperature of the operating device. In particular, the warmer the operating device, the smaller it should be.

In the following, the head room or headroom voltage is considered to be the headroom of the post-regulator, i.e. the possibility of controlling a linear regulator or buck converter. The headroom voltage is the potential between the negative output (=negative pole for the load connection/for the LEDs) and GND or circuit ground. The headroom swing is considered to be the swing of the headroom, i.e. twice the amplitude of the modulation of the intermediate circuit voltage by the mains hum. The headroom swing is therefore the differential voltage from the minimum to the maximum of the headroom.

A hysteresis band control is particularly well suited for controlling such clocked converters that have an inductance in which a continuous or non-intermittent current flows. Due to the clocking of the converter, the continuous current is sawtooth-shaped, and the difference in values between the resulting maxima and minima of the curve of the continuous current is determined by the width of the hysteresis band. In most cases, a setpoint for the continuous current is in the middle of the hysteresis band. Then, using a symmetrical Schmitt trigger that compares the curve of the continuous current with the corresponding setpoint, the control for clocking the converter can be generated directly. The narrower the hysteresis band in the Schmitt trigger, the higher the clock frequency. If the current curve exceeds the upper limit of the hysteresis band, an active power transistor in the clocked converter switches off, and if the current curve falls below the lower limit of the hysteresis band, the same power transistor switches on again.

As can be seen from this brief explanation, the same result can also be achieved by using a simple comparator to compare the curve of the continuous current with the corresponding setpoint, and by time-delaying both switching actions triggered by the comparison-power transistor on when current is below setpoint and power transistor off when current is above setpoint. The resulting clock frequency is indirectly proportional to the time delay.

A special form of this is a constant switch-off time control, which in turn works with a simple comparator as a clock generator, and in which only the switch-on command is time-delayed, resulting in an approximately constant switch-off time for the active power transistor. After this switch-off time, the power transistor is switched on, and as soon as the curve of the sawtooth-shaped current exceeds its setpoint, the power transistor is switched off again. This control is similar to switching off after a peak current is detected, but is also a hysteresis band control, its lower limit being defined by the constant switch-off time and its upper limit corresponding to the setpoint for the continuous current. A static difference between an average value of the sawtooth-shaped curve of the continuous current and its peak value should be compensated by an integrating component of a controller connected upstream of this control.

In case of overtemperature, the headroom, which is amplitude-modulated with the mains hum, should also be able to run dry in sections and periodically in order to interrupt the activity of the post-regulator, causing a natural current reduction that protects the operating device. At the same time, the operating device is then relieved of part of the losses in the post-regulator. In contrast to the literature cited above, however, this should only occur here depending on the situation, in particular depending on the temperature, so that operating points without interruptions in the activity of the post-regulator should also be possible, in particular in normal cases, whereby very smooth and thus very small or very low dimmed output currents are possible. The temperature measurement should be carried out directly by the control circuit: if necessary, the sensors should be isolated from the object to be measured by the circuit carrier. Due to particularly good cooling of the output side of the operating device, its operating range should be expandable.

In an overtemperature range, the post-regulator should repeatedly interrupt its activity periodically, and the control circuit should be able to calculate the differential load resistance by comparing multiple different operating points over a longer period of operation in order to adjust the length of the time periods without headroom, i.e. with interruption of the activity of the post-regulator, to a permissible ripple of the output current. In particular, it should be possible to determine how far the output current drops at a given temperature and the resulting interruption time, what average value for the output current results from this, and whether it would not be better to lower the setpoint towards this average value in order to prevent the operating device from heating up, shorten the interruption times and thus reduce the ripple of the output current again.

Another parameter for the modulation of the headroom by the mains hum, e.g., for the level of the voltage amplitude at twice the mains frequency on the headroom, is the capacitance of the intermediate circuit capacitor, which decreases by up to 40% over the course of its service life. In particular, the energy stored there should be set into relation to the power currently being drawn, which initially means that the smaller the power drawn and largely passed on to the device output, the smaller the mains hum. And the smaller the capacitance of the intermediate circuit capacitor, the greater the mains hum. According to the formula $\frac{1}{2} CU^2$, the stored energy decreases quadratically with a decrease in the intermediate circuit voltage and thus the mains hum increases quadratically, provided that the same power is always drawn. Even if the output power decreases with a decrease in the intermediate circuit voltage, as is the case with resistive loads, for example, there is still a linear increase in mains hum. The higher the mains hum, the faster an intermediate circuit capacitor ages due to its self-heating caused by losses in the dielectric. Over very long periods of time, the overall system is unstable because an increasing mains hum caused by a decreasing intermediate circuit capacitance also increases the losses and thus the power currently being drawn, which in turn increases the mains hum and accelerates aging, which ultimately causes the intermediate circuit capacitance to decrease even faster. Conventional designs with fixed intermediate circuit voltages and large headrooms require greatly oversized intermediate circuit capacitors in order to meet the required service life, because the condition at the end of the service life should be taken into account in the calculation.

Further aspects of the present disclosure relate to being able to use either a smaller intermediate circuit capacitor for a constant service life or to achieve a longer service life of the operating device with the same intermediate circuit capacitor by skillfully controlling the headroom. Workarounds in the form of a slightly smaller intermediate circuit capacitor with a slightly longer service life are also being sought. In particular, the properties of an unused intermediate circuit capacitor are to be better utilized by deliberately underloading it.

DETAILED DESCRIPTION

According to at least one aspect of the present disclosure, relates to a circuit arrangement for operating a load having an input for inputting a mains power, and an output with a positive output connection and a negative output connection for operating a load with an output current and an associated output voltage, a first clocked converter with a SELV barrier between its primary side and its secondary side for generating a converter output current in order to generate an intermediate circuit voltage with a ripple on the secondary side and thereby control it to an adjustable mean value of the intermediate circuit voltage, the circuit arrangement being designed for controlling the first clocked converter such that the mean value of the intermediate circuit voltage can follow the output voltage with a distance corresponding to the headroom voltage, a post-regulator connected downstream of the first clocked converter for regulating the ripple on the intermediate circuit voltage generated by the first clocked converter, a first optocoupler for transmitting information about a current setpoint of the output current from the primary side to the secondary side, a second optocoupler for transmitting information about a headroom voltage from the secondary side to the primary side to enable a control of the intermediate circuit voltage by the first clocked converter, the headroom voltage corresponding to the potential difference between the negative output connection and a circuit ground, exactly one control circuit on the primary side for controlling the circuit arrangement, the control circuit being designed to control the headroom voltage to the smallest possible value in order to set the power loss in the circuit arrangement and in particular in the post-regulator to a small value and at the same time to keep the ripple of the output current as low as possible. This measure enables precise control to an output current without establishing a closed control loop by merely transmitting the setpoint of the output current from the primary side of the SELV barrier to the secondary side, and by transmitting a simple information about the currently prevailing headroom voltage from the secondary side to the primary side, the circuit arrangement being advantageously designed such that the first clocked converter advantageously only adjusts the intermediate circuit voltage according to the information about the currently prevailing headroom voltage, and the post-regulator advantageously adjusts the output current and regulates the ripple of the intermediate circuit voltage.

In an at least one embodiment, the control circuit regulates the value of the headroom voltage and finely adjusts it as a function of the output current and/or the output voltage and/or the temperature of the circuit components and/or the number of operating hours performed in such a way that the headroom voltage is increased in the range of the fine adjustment up to an upper value, so that the power loss in the circuit arrangement and in particular in the post-regulator is increased up to a predetermined limit in order to minimize the ripple of the output current. This measure advantageously provides a very good quality of the output current and thus, when LEDs are connected as a light source, a very good quality of light without major light modulation.

In another alternative embodiment, the control circuit controls the value of the headroom voltage and finely adjusts it depending on the output current and/or the output voltage and/or the temperature at the circuit components and/or the number of operating hours performed such that the headroom voltage is reduced to a lower value in the range of the fine adjustment, so that the ripple is increased up to a predetermined limit in order to thereby set the power loss in the circuit arrangement and, in particular, in the post-regulator to an even lower value. This measure advantageously reduces the power loss of the circuit arrangement to a minimum, which is particularly advantageous for installation locations of the circuit arrangement where high temperatures prevail, because it protects the circuit arrangement from premature failures.

In at least one embodiment, the control circuit is designed for operating the first optocoupler purely digitally and for operating the second optocoupler either in a mixed mode, with the second optocoupler transmitting a periodically recurring analog signal with gaps between the sections of the analog signal which are greater than zero, or the control circuit is designed for operating the second optocoupler purely digitally, with the second optocoupler transmitting a digital signal which has a low level which corresponds in time to the gaps of the analog signal and otherwise has a high level. This measure advantageously ensures that the optocouplers are operated such that the known signs of aging do not have a negative effect on the function of the circuit arrangement, as these do not play a role in digital operation, nor in mixed mode operation.

In at least one embodiment, the first clocked converter additionally operates as a power factor corrector. This advantageously is a particularly simple, cost-effective and space-optimized solution for the circuit arrangement in order to be able to comply with the required standards for mains operation.

In another embodiment, a microcontroller is part of the control circuit. This is a cost-effective and very flexible solution for designing the control circuit.

In at least one embodiment, the post-regulator is a linear regulator. This is a particularly cost-effective solution that ensures maximum quality of the output current with manageable losses, since linear regulators can control very quickly and thus the ripple on the output current is very well regulated.

In at least one other embodiment, the post-regulator is a second clocked converter in the form of a buck converter. This is an alternative that advantageously generates less power loss, but is more complex and expensive to manufacture. The buck converter can be controlled by means of hysteresis band control, which is particularly easy and cost-effective to implement. As a special form, the buck converter can also be controlled by means of constant switch-off time control after peak current detection, which is even easier to implement.

In at least one further embodiment, the post-regulator is designed for controlling the output current to a setpoint without transmitting an actual value of the output current back to the control circuit. This has the great advantage of a much simpler feedback, since no analog value has to be transmitted that could be distorted by the aging of the optocoupler and then, as the number of operating hours increases, a no longer correct current would be delivered at the output of the circuit arrangement.

In a further related embodiment, the control circuit is designed for transmitting the setpoint purely digitally via the first optocoupler to the post-regulator. As already mentioned above, this has the great advantage that the signs of aging of the optocoupler cannot have a negative effect on the quality of the current control. In at least one example, the control circuit is designed for transmitting the setpoint as a duty cycle of a pulse width modulation via the first optocoupler to the post-regulator, the associated frequency being 30 Hz to 1 kHz, advantageously 60 Hz to 170 Hz, and particularly advantageously 140 Hz or 145 Hz. This measure offers the great advantage of a simple and cost-effective generation of the pulse width modulation, with the control being able to work very accurately and the signal, as a digital signal, is not subject to degeneration by the optocoupler.

In at least one embodiment, the circuit arrangement is designed for measuring the headroom voltage in the post-regulator and for evaluating the measurement result by a detection circuit, the detection circuit emitting a signal to the second optocoupler as long as the headroom voltage exceeds a limit, the signal containing the amount by which the limit is exceeded by the headroom voltage, and the limit being stored in the detection circuit. This measure offers the very great advantage that no quantitative signal, but merely a qualitative signal, has to be generated and transmitted, so that here too, so that the signs of aging and the component tolerances do not play a role here either, as the purely qualitative character of the signal means that the best results can still be achieved in the control of the circuit arrangement even with minor deviations.

At least one embodiment of the present disclosure relates to a control method for a circuit arrangement described above, including or characterized by the following steps:
  receiving the signal from the control circuit,
  controlling the first clocked converter to an intermediate circuit voltage according to the value of the signal
  transmitting the setpoint of the output current via the first optocoupler to the post-regulator,
  regulating the ripple of the intermediate circuit voltage and controlling the output current of the circuit arrangement by the post-regulator,
  transmitting the signal from the detection circuit to the control circuit. These methods establish control with a feedback loop, which is, however, much simpler than known control methods, since a quantitatively accurate signal does not have to be transmitted in every direction, but merely a qualitative signal, which places much simpler requirements on the components involved and thus enables a circuit arrangement that can be manufactured more cost-effectively with the same quality.

In at least one embodiment of the control method, the minimum of the headroom voltage is 0.0V . . . 0.5V and particularly advantageously 0.0V . . . 0.2V, and the swing of the headroom voltage is 1 V . . . 2.5V and particularly advantageously 1.3V . . . 1.8V if the post-regulator is a linear regulator. This advantageously ensures particularly efficient operation with minimal losses of the post-regulator.

In at least one alternative embodiment of the control method, the minimum of the headroom voltage is 0.0V . . . 10V and particularly advantageously 0.0V . . . 2.5V, and the swing of the headroom voltage is 2V . . . 12V and particularly advantageously 5V . . . 8V if the post-regulator is a buck converter. This measure also ensures efficient operation with optimal effect of the buck converter.

In at least one further embodiment, the control circuit measures a temperature of the circuit arrangement, and the intermediate circuit voltage is reduced when the measured temperature exceeds a predetermined temperature. This advantageously ensures that the circuit arrangement cannot be overloaded and thus has a very long service life.

Further embodiments can be found in the entire disclosure, with the presentation not always distinguishing in detail between device and aspects of use: in any case, the disclosure is to be read implicitly with regard to all claim categories.

BRIEF DESCRIPTION OF THE DRAWINGS

Further advantages, features and details of the present disclosure will become apparent from the following description of embodiments and from the drawings, in which identical or functionally equivalent elements are provided with identical reference numerals. In the drawings.

EXEMPLARY EMBODIMENT OF THE PRESENT DISCLOSURE

Figure 1:
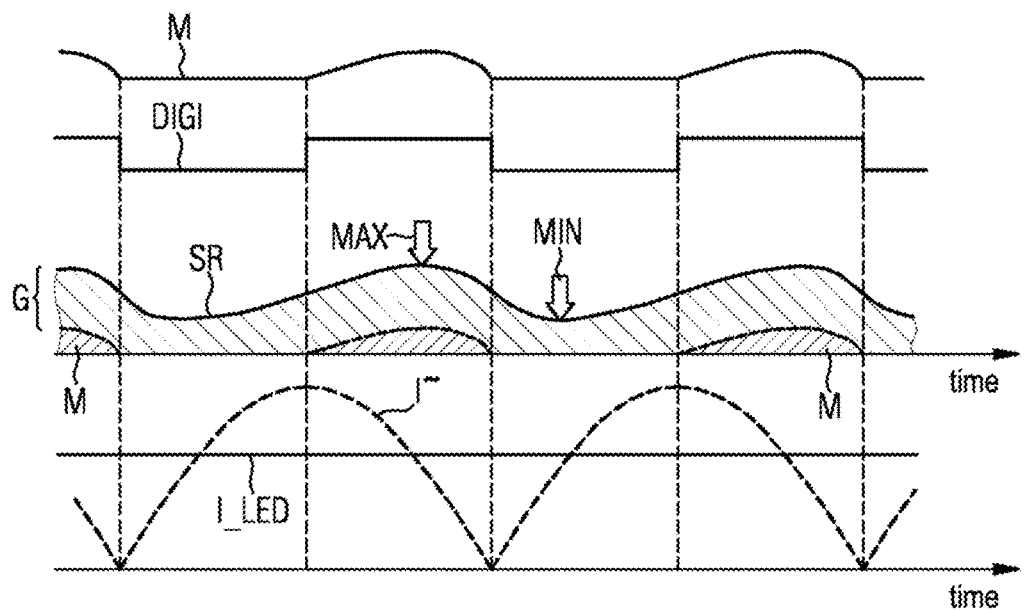
FIG. 1 shows an overall situation with a large fixed limit for the headroom and with its control symmetrical around this limit.

FIG. 1 shows a possible overall situation within a specified operating device, which is described by five electrical variables. The constant output current I_LED in the lower graph corresponds to the time average of the rectified sinusoidal current I~ which corresponds to the input current converted to the output side. This is because this input current is usually taken from a public AC power supply network and therefore is sinusoidal. If the time value of the current I~ is greater than the output current I_LED, there is excess power, which is used to recharge an intermediate circuit capacitor that terminates each first clocked converter operating as a power factor correcting input stage of the operating device. Conversely, the same intermediate circuit capacitor acts as a buffer as long as the time value of the current I~ is below the output current I_LED, i.e. as long as there is a power shortfall. If the intermediate circuit capacitor only has finite capacity, as is usually the case, the alternation between excess power and power shortfall causes a mains hum, as can be seen in the ripple of the voltage SR in the middle graph of the figure, which voltage oscillates between its MAX and MIN values. The voltage SR describes headroom for the post-regulator to operate and corresponds exactly to the intermediate circuit voltage reduced by the constant output voltage (not shown). At a constant distance G a measuring voltage M, if positive, moves below the headroom SR, which is shown again in the top graph of the figure and leads directly to an evaluation signal DIGI: DIGI is "one" or at a high level when the measuring voltage M is greater than zero. The constant distance G corresponds to the fixed limit for the output voltage-dependent control of the headroom SR mentioned above.

Figure 2:
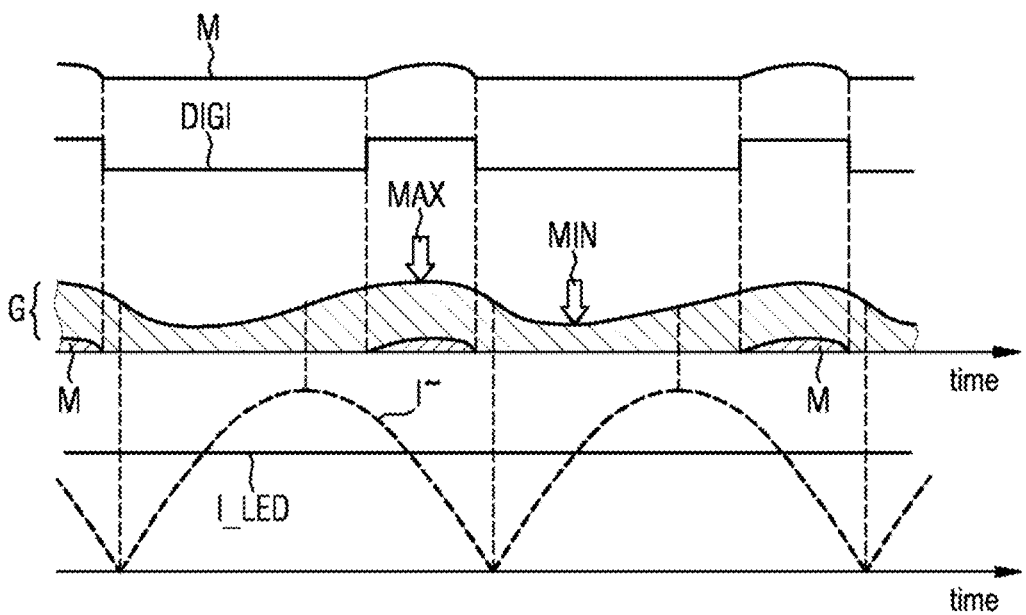
FIG. 2 shows a second overall situation of equal-sized limit and control of the headroom from this limit asymmetrically downwards.

FIG. 2 uses the same five electrical variables from the previous figure to illustrate a first method for reducing the actual headroom while maintaining a fixed limit G and at the same time the general principle underlying the control method for the specified operating device. The duty cycle of the DIGI signal is reduced. This is done indirectly by reducing the power of the first clocked converter operating as a power factor correcting input stage, while DIGI is permanently monitored at the same time. The power is reduced until DIGI shows a desired duty cycle. The principle works in the same way in the other direction: If the duty cycle in DIGI increases because more power flows through the input stage, the intermediate circuit voltage and thus the headroom SR is also larger, but this is undesirable. In short, the control of the intermediate circuit voltage is reduced to the bare minimum and for that its characteristic, its ripple, is also utilized. The only thing that remains to be checked is whether there is any headroom SR or not. Its approximate size is ensured by the limit G, and the output voltage-constant and arbitrary within a given range-intrinsically "inflates" the very small headroom SR to a real intermediate circuit voltage as currently required by the connected load.

Its maximum MAX and thus simultaneously the maximum of the headroom SR is in terms of time at the end of each phase with excess power, i.e. when the sinusoidal current I~ crosses the output current I_LED while falling, and its minimum is consequently at the end of each phase with power shortfall including the current zero crossing of I~, i.e. when the sinusoidal current I~ crosses the output current I_LED while rising. At the time of this current zero crossing of I~, the headroom SR has its largest decrease and at the same time its average value. The same applies at the time of the maxima of I~: There, the headroom SR has its strongest increase and again its average value. This is because the total decrease between MAX and MIN corresponds to the total increase, and because of the sinusoidal current I~ causing all this, the points of the average value of SR also lie in terms of time exactly between the respective times of MAX and MIN. As the maxima of the sinusoidal current I~ are closer to the output current I_LED than its zero crossings, the largest increase in the headroom SR is smaller in magnitude than its largest decrease. It ultimately follows that the time durations of the increases of an intermediate circuit voltage generated by a power factor correcting input stage are longer than the time durations of the decreases of the same intermediate circuit voltage as soon as active power is drawn from the intermediate circuit. The same applies to the headroom SP and is, in addition to the exact doubling of the frequency of an AC power supply network, the second typical feature of any mains hum originating from a power factor corrector.

In addition to the above-mentioned whether observation, the measuring voltage M enables a finer resolution of the measurement of the headroom SR. Compared to the corresponding time course from the previous figure, the positive sections of the M time course here are not only shorter, but also flatter or lower. If this M voltage time course is low-pass filtered, a very finely resolved signal is generated for the height of the headroom.

Figure 3:
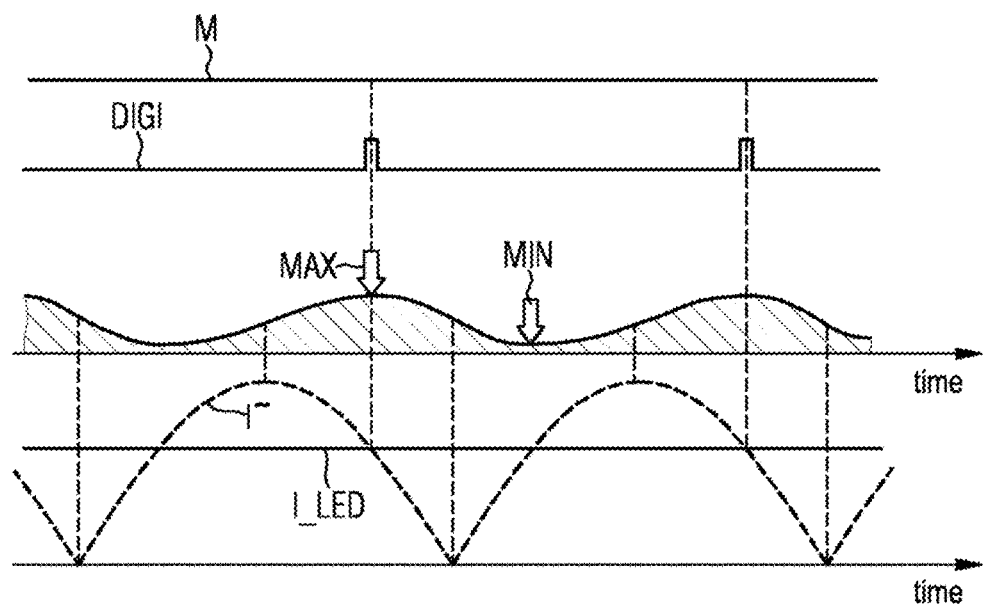
FIG. 3 shows a third overall situation of equal-sized limit and control of the headroom to a minimum value possible therewith.

In FIG. 3 the limit G is consumed. The minimum MIN of the headroom SR is now just above zero. The evaluation signal DIGI only shows short peaks, the measuring voltage M has disappeared. Hence it is evident that in order to apply the control method associated with the specified operating device, both signals, i.e. DIGI and M at the same time, should be evaluated, but in any case the pulse-shaped signal DIGI, since this signal contains the exact information about when the headroom SR has actually become minimal.

Secondly, it is evident from this that such a minimization or consumption of the headroom SR, which should still be consistently positive while maintaining the function, is only possible if the fixed limit G is at least as large as the ripple in SR, i.e. the voltage difference between MAX and MIN, which is load-dependent. Normally, for determining the ripple the maximum power at the same time as the minimum possible intermediate circuit voltage is utilized. At the same time, there are many possible special cases behind this where this normal design principle can be deliberately abandoned in order to achieve more complex optima. Another important boundary parameter here is the capacitance of the intermediate circuit capacitor. This is because it also influences the ripple in the headroom SR: the ripple is indirectly proportional to the capacitance.

Thirdly, if the height of the headroom is also a measure of the losses, as is the case with linear regulators as post-regulators, it becomes apparent here that significantly larger intermediate circuit capacitors are required for linear regulators than, for example, for clocked post-regulators, which generate significantly smaller losses than linear regulators almost independently of their headroom SR. Large intermediate circuit capacitors enable significantly reduced MAX values of the headroom for a given MIN value, thus correspondingly lower limits G and a greater minimization of the total headroom SR with consequently reduced losses in the linear regulator. In the case in question, a lack of space actually led to a switch from a linear regulator to a clocked post-regulator in order to be able to install a—also mechanically—significantly smaller intermediate circuit capacitor.

Fourthly, there is a very apparent fuzzy character inherent in the control method for the specified operating device, which focuses on the essentials. The unpleasant release effects that often occur in analog control loops in particular are elegantly avoided by simply not controlling at all in the regions of such releasing and only controlling proportionally with an extra high loop gain in between. In other words, the input stage runs in an uncontrolled manner at its maximum power if no DIGI signal is measured at all because the intermediate circuit voltage is much too low. Conversely, the input stage is completely switched off if the DIGI signal is permanently measured at its high level, because the intermediate circuit voltage is then much too high. Only the detection of a level change due to the mains hum activates the intermediate circuit voltage and thus the headroom control. The duty cycle in DIGI runs through its entire observable range from 1% to 99% or from 0.1% to 99.9% if the headroom SP only changes by 2 V, for example. This means that a large part of the above-mentioned extra high closed-loop gain is already included in the measurement.

Overall, for loss-insensitive, i.e. clocked, post-regulators, the formulation G>MAX−MIN is the rule of thumb for the fixed limit G. The minimum MIN of the headroom SR can be between 0 V and 10 V, particularly advantageously between 0 V and 2.5 V. A swing of the headroom SR, given by the term MAX−MIN, can be 2 V to 12 V and particularly advantageously 5 V to 8 V, which also specifies the limit G for MIN=0 V. If minima with a positive value are to be maintained, their value is be added to G. The maximum MAX of the headroom SR can therefore be in a range from 2 V to 22 V. The limit G is ultimately defined by the value of MAX.

Or for linear post-regulators, as shown in FIG. 3, the headroom SR is controlled to a possible minimum, so that MIN is just positive. With this control to the minimum, the mean value of the headroom SR is automatically lowered for small output currents. This is advantageous because flicker is also optimized in such a way that the mean value of the headroom is reduced at small currents.

Figure 4:
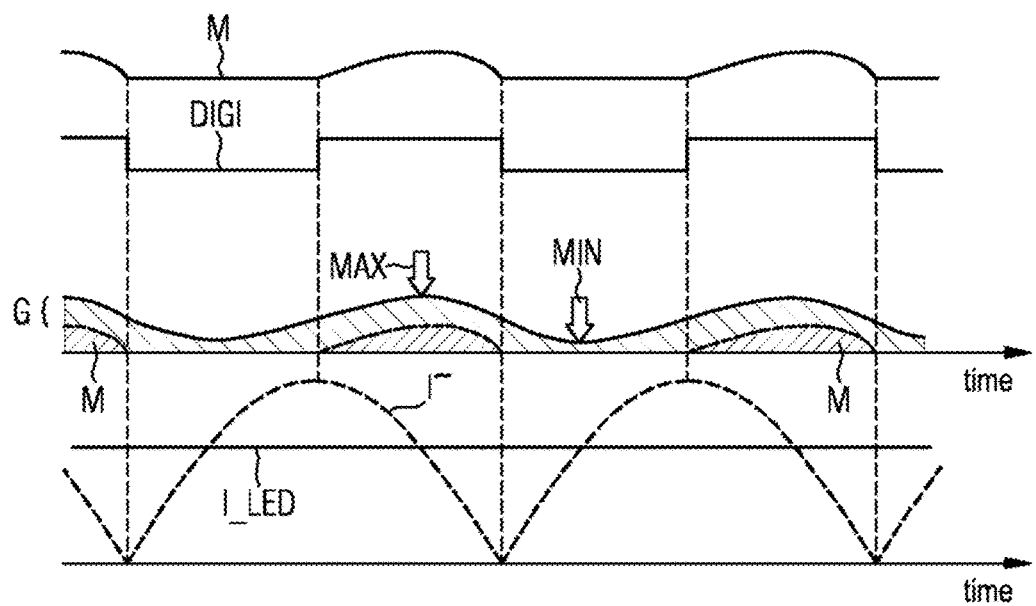
FIG. 4 shows a fourth overall situation with a small fixed limit for the headroom and with its control symmetrical around this limit.
Figure 5:
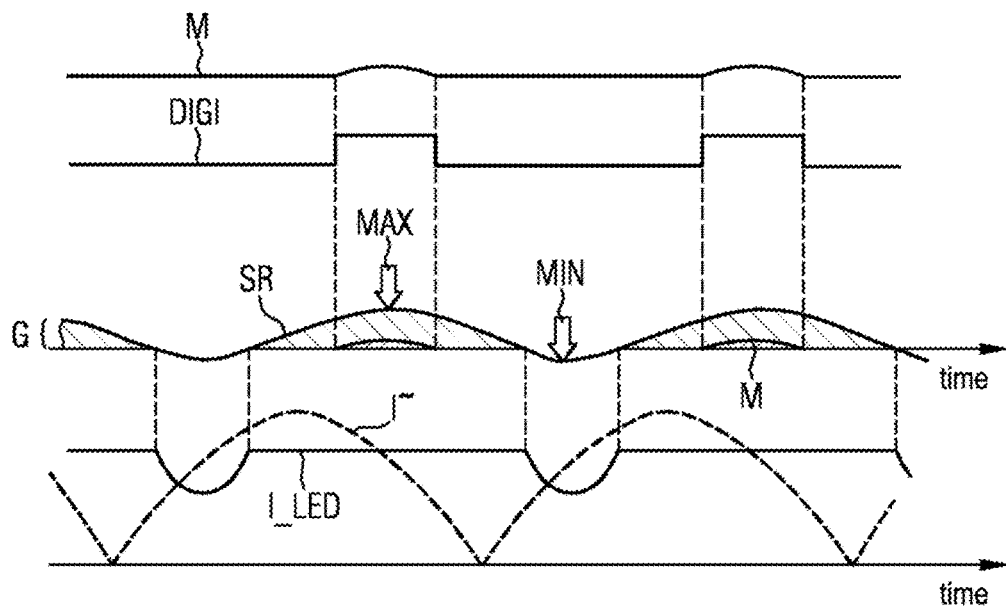
FIG. 5 shows a fifth overall situation with an equally small limit and control of the headroom from this limit asymmetrically downwards, the headroom periodically running dry, in each case at the same time the operation of the post-regulator is interrupted, and therefore the output current drops.

FIG. 4 illustrates a second method to reduce the headroom SP. With otherwise identical boundary parameters as in all three previous figures, the fixed limit G is chosen to be smaller. This reduction causes a similar reduction of the headroom SR even at all times, as a direct comparison of the present figure with FIG. 1 reveals. All other time courses are identical. If, as in FIG. 4, the limit G is chosen to be slightly larger than half the ripple in SR, i.e. at least as large as half the voltage difference between MAX and MIN, the decision as to whether a continuous headroom SR is present or not is shifted to a duty cycle of about 50% on the signal DIGI, as FIG. 5 clearly shows. Here, the duty cycle in DIGI is only slightly below 50%, and the headroom SR runs dry periodically recurring, as illustrated by the negative sections in the SR time course, which are not actually possible, but which illustrate the course of the associated intermediate circuit voltage. And they illustrate by how much the output voltage is too low, because the zero line of the headroom SR represents the "positive end" of the output voltage. In these negative sections of the SR time course, the post-regulator is inactive or interrupts its activity or switches off, but remains connected through with low impedance, so that the load, primarily a series circuit of LEDs provided for general lighting technology, remains supplied, but with a periodically reduced output current I_LEDSR.

This reduces the output power even though the specified operating device does not provide for this reduction because an output current control circuit is periodically interrupted.

This also reduces the input power accordingly, as can be seen from the reduced amplitude of the current I~, which corresponds to the input current. Its time course, however, remains unchanged sinusoidal, firstly because the intermediate circuit capacitor has a very large capacitance and, secondly, because in connection thereto the obligatory slowness of each power factor correcting controller means that this very controller does not even notice such short-term drops in the output current I_LED, which would manifest themselves in a "hump" on the intermediate circuit voltage.

The extent to which the output current I_LED drops depends on the internal forward voltage of all series-connected LEDs, which acts as a counter voltage on the output of the specified operating device and which is normally constantly smaller than its output voltage, and on a differential load resistance R_diff, which together with the normally controlled output current I_LED causes this constantly small difference. The actual output voltage above which the headroom is located is calculated according to the formula $$\text{actual output voltage} = \text{internal forward voltage} + R\_diff * I\_LED.$$

During the periodically occurring time periods without control and therefore with a dropping output current I_LED, this formula is reversed to $$I\_LED = (\text{intermediate circuit voltage} - \text{internal forward voltage})/R\_diff,$$

taking into account that when the post-regulator is inactive the actual output voltage corresponds to the intermediate circuit voltage. At first glance, it appears as if the output current can remain the higher even during its drops, the lower the impedance of the differential load resistance is. In reality, however, it is the other way around. This is because the lower the impedance of the differential load resistance R_diff, the smaller the difference between the output voltage and the internal forward voltage, i.e. the value of R_diff cancels out. Therefore, the shape of the load current drops in the I_LED curve corresponds pretty much exactly to the shape of the headroom SR in the time periods in which it is "negative". The above voltage difference is consumed all the more clearly, visible in a drop in the output current I_LED, the smaller it is and, moreover, the lower the impedance of the differential load resistance. Therefore, the lower the impedance of the differential load resistance, the greater the drop in the output current I_LED if there is no headroom SR or if the post-regulator is switching off. If it were zero, the load current would even be intermittent despite the output voltage being clearly present but slightly too low.

Conversely, this consideration offers the possibility of observing the load more closely during normal operation, i.e. with constantly controlled values of I_LED, if at least two different heights I_LED1 and I_LED2>I_LED1 were reached within a defined period of time. The actual output voltage is also known exactly via the headroom defined by the fixed limit G. The internal forward voltage is assumed to be independent of the current. At the value I_LED2, an actual output voltage U_A2 will be set which is slightly higher than an actual output voltage U_A1, which is set at the lower output current I_LED1. The previously unknown but important value R_diff is calculated as $$R\_diff = (U\_A2 - U\_A1)/(I\_LED2 - I\_LED1)$$

according to the general definition of a differential resistance. If the control circuit of the specified operating device has a µprocessor with non-volatile memory in which some past values for the intermediate circuit voltage and for the output current are stored, it can carry out the above calculation after each setpoint change and is then aware of the currently effective value of a differential load resistance. If the calculation result is zero or negative, for example, there is a load change and the last calculation is discarded.

A further developed program for the control circuit can calculate the time durations during which a post-regulator is switching off or is inactive, taking into account further boundary parameters from the applicable limit G and the duty cycle in the signal DIGI. If R_diff is known, it is possible to calculate how far the load current I_LED drops. This is because, as will be shown later, the control circuit is not aware of the actual load current curve. The abovementioned drop shape, the switch off time duration of the post-regulator and the controlled value of the output current I_LED can be used to calculate an average value of the output current that has just resulted, which can be used as a new setpoint, for example. Or a value between the previous setpoint for I_LED and the calculated average value is used as the new setpoint for the output current.

This is because periodically off switching post-regulators are not the rule but the exception in the specified operating device, which means that it goes beyond the state of the art cited at the beginning. Furthermore, a post-regulator should only be switching off if it is a linear regulator, as such a regulator can become very hot. Its temperature can be measured and is then known to the control circuit. The higher this temperature, the smaller the headroom should be, and the more the duty cycle in DIGI is pulled below 50% by reducing the power, which in itself counteracts further heating of the operating device. According to FIG. 5, the switch offs of the post-regulator soon occur, which in themselves cause a further reduction in losses and thus less further heating, and whose time durations and resulting load current curves I_LED can be calculated by the further developed program for the control circuit, resulting in a lower setpoint for the output current I_LED that is more favorable for the current temperature. If this is set instead of the one actually specified, the heating of the operating device can be completely captured, which means that the operating device is very effectively protected against overheating.

Overall, the formulation G>½*(MAX–MIN) results as a rule of thumb for the fixed limit G when using linear regulators as post-regulators. Firstly, the decision limit as to whether the headroom SR is still present throughout is shifted to the optimally detectable range around 50% of the duty cycle in the evaluation signal DIGI, so it can be controlled very precisely to the "limit of existence" of the headroom, and secondly, even with switch offs of the post-regulator, a measurable duty cycle still remains in DIGI. This can be used advantageously to estimate the switch off time duration. With linear regulators as post-regulators, the minimum MIN of the headroom SR should be in the range between 0 V and 0.5 V, particularly advantageously in the range between 0 V and 0.2 V. A swing of the headroom SR, given by the term MAX–MIN, should be between 1 V and 2.5 V, particularly advantageously between 1.3 V and 1.8 V. The maxima MAX of the headroom SR are therefore in a range between 1 V and 3 V. If the duty cycle of the DIGI signal is to be exactly 50% while the headroom is precisely maintained, exactly half of the swing defines the limit G using the equation G=½*(MAX−MIN).

Figure 6:
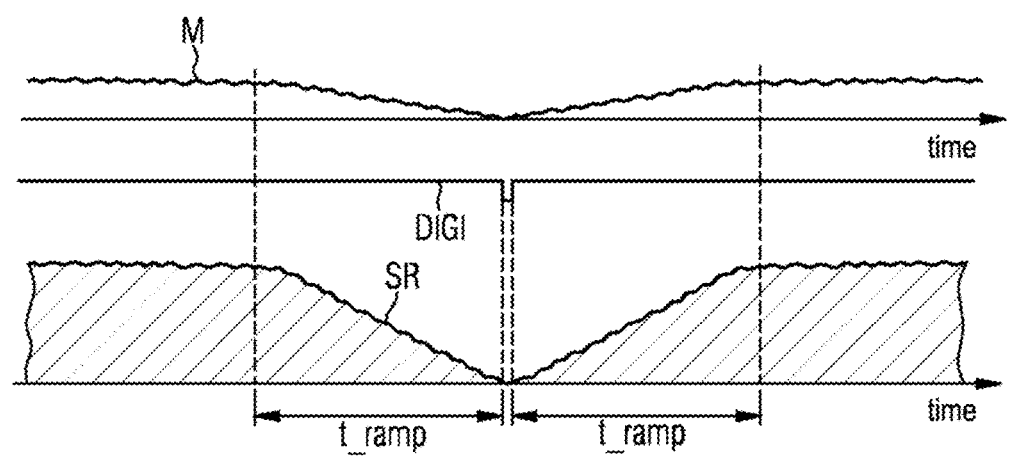
FIG. 6 shows a possibility to also control higher headrooms with the specified method.

FIG. 6 extends the space shown so far both in terms of time and voltage. It shows dozens of mains periods, countable by the small waves in the course of the headroom SR, and the amplitude of these small waves, which often use up the entire headroom at the top, reveals that here the headroom SR itself is also significantly higher. This mode of the specified control method is useful for very low output voltages, i.e. those of, for example, less than 5 V or less than 10 V, because the currents in the intermediate circuit capacitor can become exorbitant if the intermediate circuit voltage is tracked to just above such values, as shown in all the previous figures. It then makes more sense to there save losses and, in particular, aging by increasing the intermediate circuit voltage and instead allow slightly more losses in post-regulator 1 or 1'. This mode is particularly suitable when a post-regulator 1' contains a clocked buck converter.

Furthermore, this mode can require analog feedback on the state of the headroom SR by means of the difference signal M, as the lack of data in the signal DIGIsignal clearly shows.

Since only the headroom SR is measured, neither the intermediate circuit voltage nor the output voltage are known. To remedy this deficiency, the headroom SR is slowly reduced over a time duration t_ramp until it is completely used up, as indicated by the drop in the signal DIGI. At this point, the intermediate circuit voltage corresponds to the output voltage. Now the following happens: Its instantaneous voltage ratio is calculated based on the duty cycle averaged over a mains period in the first clocked converter, which forms the power factor correcting input stage. The intermediate circuit voltage is determined therefrom using the mains voltage measured averaged over the same period. Or the peak value of the mains voltage is detected and measured, at the same time the current voltage transformation of the first clocked converter is determined based on the current duty cycle in the power factor correcting input stage, and the current value of the intermediate circuit voltage is obtained by multiplying the two. This value is stored as the output voltage. Subsequently, the headroom is increased again, for example, in the same time duration t_ramp, and the device knows that the intermediate circuit voltage corresponds exactly to the sum of the headroom SR and the stored output voltage. This mode is possible because, in the case of LEDs as a load, the output voltage either does not change at all or changes very slowly.

This whole procedure is repeated every 0.1 seconds to 60 seconds, and depending on this, the time duration t_ramp is particularly advantageously 0.02 to 15 seconds. Since the slope of the headroom should not be too high in order to reliably rule out flicker and other aliasing effects, the larger the headroom SR is to be, the less frequent the repetitions are, and the longer the time durations t_ramp are.

Without the procedure shown in FIG. 6, i.e. in the situations shown in FIGS. 1 to 5, the intermediate circuit voltage can be calculated in the same way and then stored as such. The output voltage is obtained by subtracting the known limit G from the calculated intermediate circuit voltage. It is important that the operating device knows the current output voltage, as this output voltage is limited by the standard for a safety extra low voltage (SELV) to certain values, e.g. 60 V, which can be quickly reached or exceeded during no-load operation or load shedding.

Figure 7:
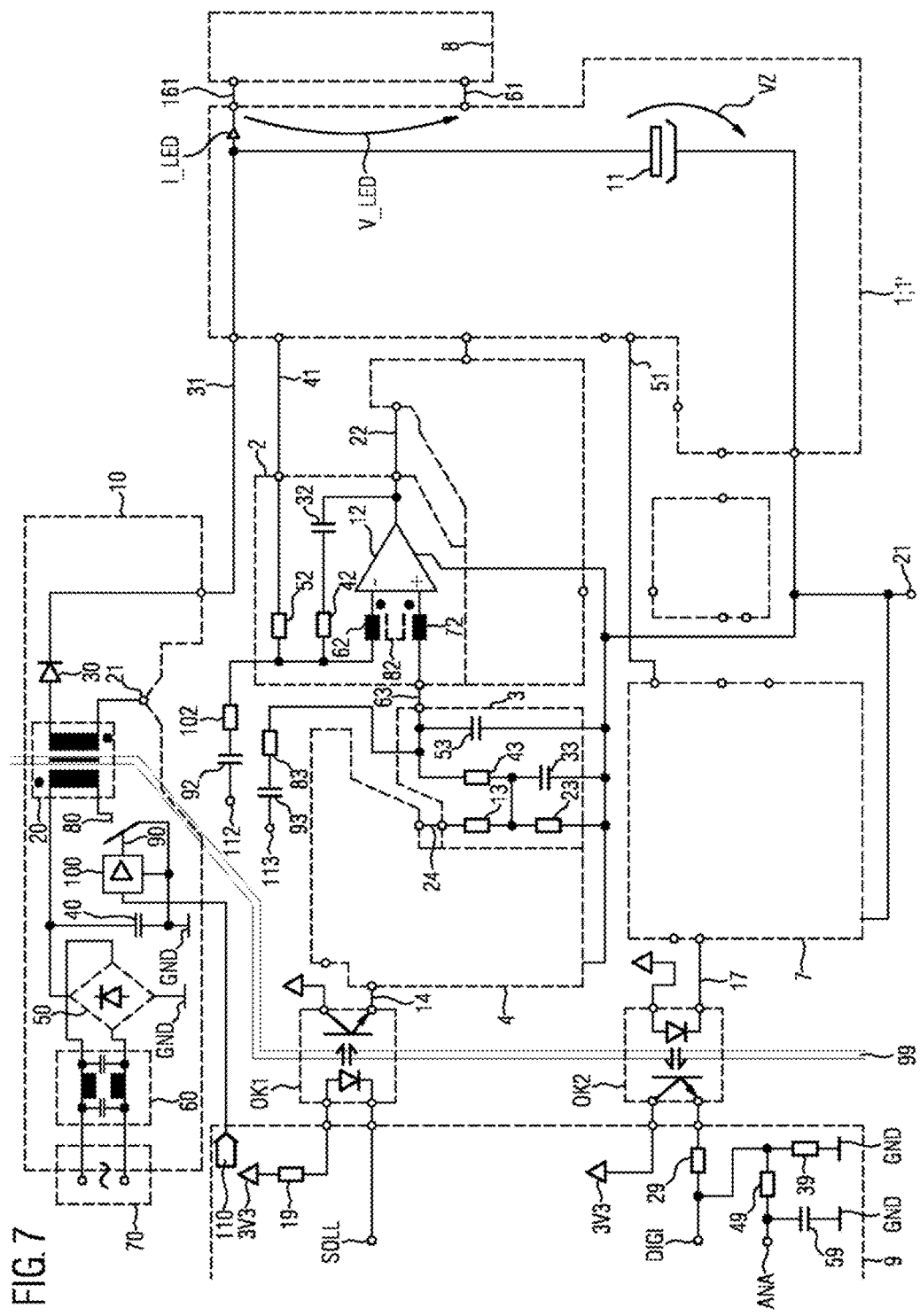
FIG. 7 shows the block diagram of an operating device.

FIG. 7 jumps to the technical realization of the specified operating device, which is designed for a control method as described up to this point. A block diagram of a possible embodiment is shown, characterized by an input side and an output side, which are connected to each other via a first optocoupler OK1 and a second optocoupler OK2. The first optocoupler OK1 transmits data signals from the input side to the output side of the specified operating device, and the second optocoupler OK2 transmits other data signals from the output side back to the input side of the operating device. Both optocouplers can be operated digitally, i.e. in a pulsed manner, in order to neutralize their non-linearity, temperature drift, aging and noise. The connecting line between the two optocouplers, represented by a double line, marks the required galvanic isolation barrier 99, which should extend through the specified operating device. Apart from the two optocouplers, the same isolation barrier 99 is only spanned by at least one radio interference suppression capacitor (not shown)—a so-called Y capacitor—and the power transformer 30 of the first clocked converter 10 forming the power factor correcting input stage, the topology of which is only hinted at here for the sake of general familiarity. Its output-side termination, an intermediate circuit capacitor 11, acts as an energy source for a post-regulator 1 and thus as an indispensable component thereof, in the case of a clocked post-regulator 1' even as an obligatory component according to converter theory. The intermediate circuit capacitor 11 is connected to an output-side circuit ground 21, which is often also referred to as safety ground, SELV ground, SELV_GND, SEC_GND or similar, and the positive pole 31 of the intermediate circuit voltage VZ, which is buffered in the intermediate circuit capacitor 11, and the determination of which is explained above. The first clocked converter operating as a power factor correcting input stage therefore supplies its output power to the input consisting of the two poles 31 and 21. The result of this supply, the output current I_LED, is measured in the post-regulator 1 or 1' and reported back in the form of a measurement voltage on a first feedback line 41.

The output current flows via a positive output 161, which is directly connected to the positive pole of the intermediate circuit voltage VZ, through a load 8 back to a negative output 61 of the post-regulator 1 or 1'. Corresponding to a static resistance and/or a forward voltage of the load 8, the output current I_LED produces an output voltage V_LED between the positive output 161, which is provided for connecting the positive pole of the load, and the negative output 61, which is provided for connecting the negative pole of the load.

The post-regulator 1 or 1' is controlled by a controller 2 comprising an operational amplifier 12 as the only active part of the controller with output 22. The entire controller is advantageously located on the output side of the specified operating device and particularly advantageous has a finite proportional-integrating gain, i.e. it is a PI controller, caused by its negative feedback surrounding the operational amplifier 12 extending from the output 22 to the negative input of the operational amplifier, which essentially consists of a series circuit of an integrating capacitor 32 and a negative feedback resistor 42. Equally important, in particular for the quantitative level of the gain of the controller 2, is a feedback resistor 52 which is connected to the feedback line 41 and, together with the negative feedback resistor 42, either directly coupled to the negative input of the operational amplifier 12 or connected to a first small inductor 62 which can be a bead choke made of ferrite, which serves to block very high-frequency interference signals which may originate, for example, from mobile telephone communications, and is in turn connected to the negative input of the operational amplifier 12. A second small inductor 72 is particularly advantageously also connected between the positive input of the operational amplifier 12 and the setpoint input 63 of the entire controller 2. Optionally, and for even more effective blocking of high-frequency interference, the two small inductors 62 and 72 can also be coupled by means of a common bead 82 such that a common mode choke is created in the direction of the two inputs of the operational amplifier 12. Figuratively speaking, both input lines for the amplifier 12 then leave the bead 82 on the same front side.

If a periodic signal is to be subtracted from the setpoint for the controller, this periodic signal can be introduced at a point 112 as a voltage with any reference potential. From this point, a high-pass filter comprising at least a high-pass capacitor 92 and a series resistor 102 leads to the first small inductor 62 or directly to the negative input of the operational amplifier 12.

Controller 2 receives its setpoint 63 from a two-stage low-pass filter 3. The reason why a single-stage low-pass filter is not sufficient is explained towards the end. An input voltage divider consisting of the divider resistors 13 and 23 attenuates a pulse-shaped input signal 24 and immediately smooths it by means of the first filter capacitor 33. A second low-pass filter connecting thereto comprising at least one filter resistor 43 and a second filter capacitor 53 forms the approximately smooth average value of the voltage across the first filter capacitor 33 as a voltage across the second filter capacitor, which is passed on to the controller as a setpoint 63. Low-pass filter 3 therefore has the object of passing on a time average value of the pulse-shaped input signal 24, weighted according to its input voltage divider, to the controller as setpoint 63.

If a periodic signal is to be added to the setpoint for the controller, this periodic signal can be introduced at a point 113 as a voltage with any reference potential. From this point, a high-pass filter comprising at least a high-pass capacitor 93 and a series resistor 83 leads to the setpoint output 63 of the low-pass filter 3.

The precision of the signal 24 at the input of the low-pass filter 3 increases significantly if only one parameter varies and thus represents the value of the signal, in this case a pulse-pause ratio, which is particularly advantageous due to the optocoupler as a transmission path. However, the voltage of the signal 24 during the pulses should be constant and the voltage during the pauses should be constant zero, both of which is accomplished by a voltage shaper 4 connected upstream of the low-pass filter 3. Its input signal corresponds to the output signal of the first optocoupler OK1 on a receiving line 14, the transmitting diode of which is connected via a current limiting resistor 19 to an auxiliary voltage 3V3 and the output SOLL of a control circuit 9 located on the input side of the specified operating device. In addition to the inverter side of the first clocked and at the same time power factor correcting converter, the input side also comprises a control circuit 9.

If the output SOLL is connected with low impedance to the ground or to the reference potential GND of the control circuit 9, which occurs periodically with a pulse-pause ratio to be transmitted, the transmitting diode of the first optocoupler OK1 also lights up periodically, and the receiving transistor of the same optocoupler also becomes conductive periodically, as a result of which the receiving line 14 also periodically assumes a high level, and this essentially with a pulse-pause ratio identical to that to be transmitted. The only distortion is caused by the dynamic and other properties of the optocoupler OK1.

This fully outlines an characteristic of the specified control method and of an operating device provided for it. The actual control of the output current I_LED is outsourced to a fast and precise analog circuit on the output side of the operating device, comprising at least the voltage shaper 4, the two-stage low-pass filter 3, the PI controller 2, and the post-regulator 1. This entire arrangement is precise and fast enough so that the control circuit 9 located on the input side of the operating device does not even have to know the exact I_LED time curve, but can rely on the information "I_LED is proportional to the pulse-pause ratio of the low impedance of SOLL". A constant proportionality factor in between, due to the actual construction of the operating device, should be be taken into account when generating the pulse-pause ratio in the control circuit 9.

In order for the described "path there" to work, i.e. so that an output current I_LED can flow, the intermediate circuit voltage VZ buffered in the intermediate circuit capacitor 11 should be sufficiently large. For this purpose, the primary side of the first clocked converter of the specified operating device should be operating correctly, which can require at least one signal return path. As already explained above, it is sufficient to report only the presence of a headroom on this signal return path, which identifies a second property of the specified control method and of an operating device provided for it. For this purpose, the post-regulator has a second feedback line 51, which is essentially connected to the negative output 61 of the post-regulator and thus carries a differential voltage with respect to the circuit ground 21 on the output side, which corresponds to the headroom SR.

The voltage on the feedback line 51 is supplied into a detection circuit 7, in which the already mentioned limit G is permanently designed into. The detection circuit 7 compares the level on the feedback line 51 with respect to the circuit ground 21 on the output side with the limit G and can connect the transmission line 17 in a low impedance manner to ground 21 when the level 51 is above the limit G, e.g., when the headroom is present and, according to the definition of G, is also large enough.

The second optocoupler OK2 can then send a signal back to the control circuit 9, which is received in two ways. A digital output DIGI is connected to the auxiliary voltage 3V3, limited only by series resistor 29, as soon as the first photon passes the optocoupler. In parallel thereto is located a high impedance pull-down resistor 39, which in turn is connected in parallel to a low-pass filter comprising a filter resistor 49 and a filter capacitor 59. Its analog output ANA supplies a voltage that is proportional to the time average of the analog measuring voltage M already explained above.

Purely numerical reference numerals such as 41 or 51 can, both above and throughout the following, describe voltages, their associated voltage-time curves or their associated electrical connections, paths, lines or nodes. In addition, the same reference numerals also describe the functions of the voltages or lines, so that the combination of only the function and the associated reference numeral can occur, such as "feedback voltage 51". Since it is obvious from the context which aspect is meant in each case, splitting the reference numerals according to these aspects makes no sense. Instead, the usual structure in electronics based on subnetworks is followed. Accordingly, the same identifier and/or the same symbol (in particular a ground symbol) can appear several times in one and the same figure, thus adequately describing the corresponding subnetwork without showing the direct electrical connections of the subnetwork. All electronic components described are also designated purely numerically. However, if the values of the designated components or electrical quantities are required in formulas, they are preceded by the qualifying letters commonly used in electrical engineering, such as $R_{45}$ for the value of the resistance 45 in ohms or $U_{22}$ for the value of the voltage on the line 22 in volts.

A first clocked converter 10, which forms the input stage and is indicated as a flyback converter, is used to supply energy to the entire operating device. This topology is often used when the input stage formed by it is to perform the following three additional tasks in addition to supplying energy:

- A power factor correction as prescribed for all general lighting purposes, i.e. the shaping of an input current or mains current coming from an AC power supply network into a curve proportional to the mains voltage of the same mains supply, ideally into a sine wave, and the minimization of the phase shift between mains current and mains voltage,
- a galvanic isolation of the output side of the operating device from its input side, and
- the generation of an intermediate circuit voltage VZ that is lower than the peak value of the mains voltage.

Its most important component is an isolation transformer 20 which not only temporarily stores the inductive energy required for every clocked converter, but also transmits the required power across the isolation barrier 99, thereby ensuring the required isolation voltage of several thousand volts. Because at least two of its windings are DC loaded, the core of the isolation transformer 20 can require an air gap. The intermediate circuit capacitor 11 is recharged from one of its windings via a rectifying diode 30 and the positive pole 31. The return circuit for this recharging takes place via the circuit ground 21 on the output side, to which the same winding that is connected to the anode of the rectifying diode 30 is also connected. The other winding of the isolation transformer 20 is connected to a terminating capacitor 40 on the input side and to the working electrode of an actively clocked power transistor or inverter switch 80, which is only shown symbolically. Its reference electrode is coupled to the circuit ground GND on the input side at least in a low impedance manner. In order for the flyback converter to produce a positive output voltage, the two windings of the isolation transformer 20 should be oriented in opposite directions as shown by the dots. The switched to active power transistor 80 is controlled via a control line 90, which is often also called the gate or base line. A pulse-shaped voltage is applied to this line, which corresponds in time to a similarly pulse-shaped output voltage 110 from the control circuit 9, which voltage controls the first clocked converter 10 and is amplified by a control amplifier 100. The recharging of the terminating capacitor 40 takes place via a mains rectifier 50, upstream of which is a radio interference filter 60. The entire specified circuit arrangement is supplied with electrical energy via a mains input 70 which is connected to the radio interference filter 60 and is designed for connecting to an AC power supply network.

Figure 8:
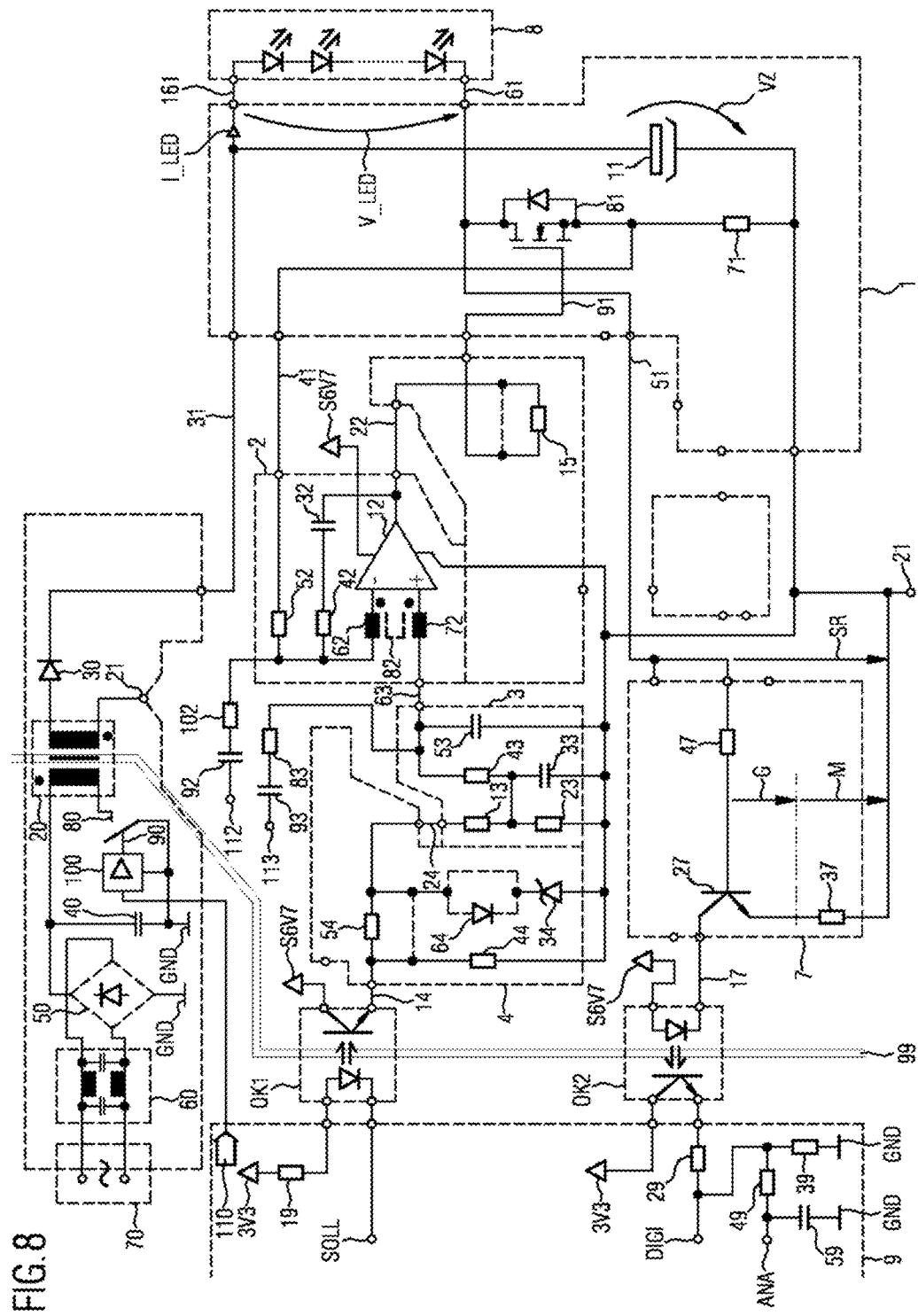
FIG. 8 shows a simple circuit variant for the output side of the operating device with a linear post-regulator.

FIG. 8 shows a simple exemplary embodiment of the specified operating device. As shown, the load 8 consists of a series circuit of multiple LEDs, which, for example, are provided for general lighting technology. The post-regulator 1 is designed as a simple linear regulator, comprising a current measuring resistor 71 and a linear amplifying transistor 81 connected in series therewith, which, as shown, is advantageously designed as a MOS field-effect transistor. Because this type of transistor is controlled via a variable voltage at its gate 91, which can come directly from the output 22 of the PI controller without statically loading this output. Advantageously, a matching resistor 15 is also connected between output 22 and gate line 91. The current measuring resistor 71 is connected in series between the circuit ground 21 on the output side and the source of the linear amplifying transistor 81, and the node therebetween is connected to the first feedback line 41. In this way, a voltage corresponding to the output current I_LED is applied on this line against ground 21. The drain terminal of transistor 81 is connected to the negative connection 61 to the load so that this linear amplifying transistor can carry the output current I_LED. The second feedback line 51 is also connected to the node in between, so that a voltage is applied there against ground 21 which corresponds to the difference between the intermediate circuit voltage VZ and the output voltage and thus exactly to the headroom SR to be monitored. This eliminates the need for a direct measurement of the intermediate circuit voltage VZ, which would require a third transmission path to the control circuit 9 concentrated on the input side, as can be seen from the circuit diagram. Since the third transmission path is then also eliminated, this design is particularly cost-effective.

The detection circuit 7 here essentially consists only of an inverting NPN bipolar transistor 27, wherein any other type of transistor can also be used at the same position in its respective inverting circuit. Between its emitter and the circuit ground 21 on the output side is located a softening resistor 37, across which the measuring voltage M drops during regular operation of the specified operating device. The base-emitter forward voltage of the bipolar transistor 27 forms the limit G, with the relationship "M=SR−G if SR>G" already explained above being available as a solution realized with real components. If SR is smaller than a forward voltage, the inverting transistor 27 switches off completely, otherwise it carries a current according to the term $M/R_{37}$, which also flows through the transmitting line 17, which is directly connected to the collector of the transistor 27. A current according to $M/R_{37}$ thus flows through the transmitting diode of the second optocoupler OK2, which gives meaning to the term "softening resistor" 37. The larger the value of $R_{37}$ is selected, the less current flows through the transmitting diode of the second optocoupler OK2. Since the auxiliary voltage S6V7 on the output side of this optocoupler, which also supplies the operational amplifier 12 in the controller 2, can be selected to be greater than SR, the voltage difference is intercepted by the collector of the transistor 27. A base series resistor 47 connects the second feedback line 51 to the base of the transistor 27.

In the simplest case shown here, the voltage shaper 4 consists only of a Zener diode 34, which ensures a required uniform voltage level, which in turn should be lower than the auxiliary voltage S6V7 on the secondary side, for the high level of the signal 24, and a pull-down resistor 44 connected in parallel to the Zener diode 34, which ensures a zero voltage for a low level of the signal 24. For temperature compensation, a forward diode 64 can also be connected in series to the Zener diode 34, and for current limitation in the receiving transistor of the first optocoupler OK1, a series resistor 54 can be connected upstream of both. Either at the anode of the forward diode 64 or at the cathode of the Zener diode 34, the signal 24 is thus generated, which contains its information only in its pulse-pause ratio and which is passed on to the two-stage low-pass filter 3. All of this, in particular the generation of uniform voltage levels for signal 24, can require the Zener diode 34, the pull-down resistor 44 and the low-pass filter 3 to be connected the circuit ground 21 on the output side.

Figure 9:
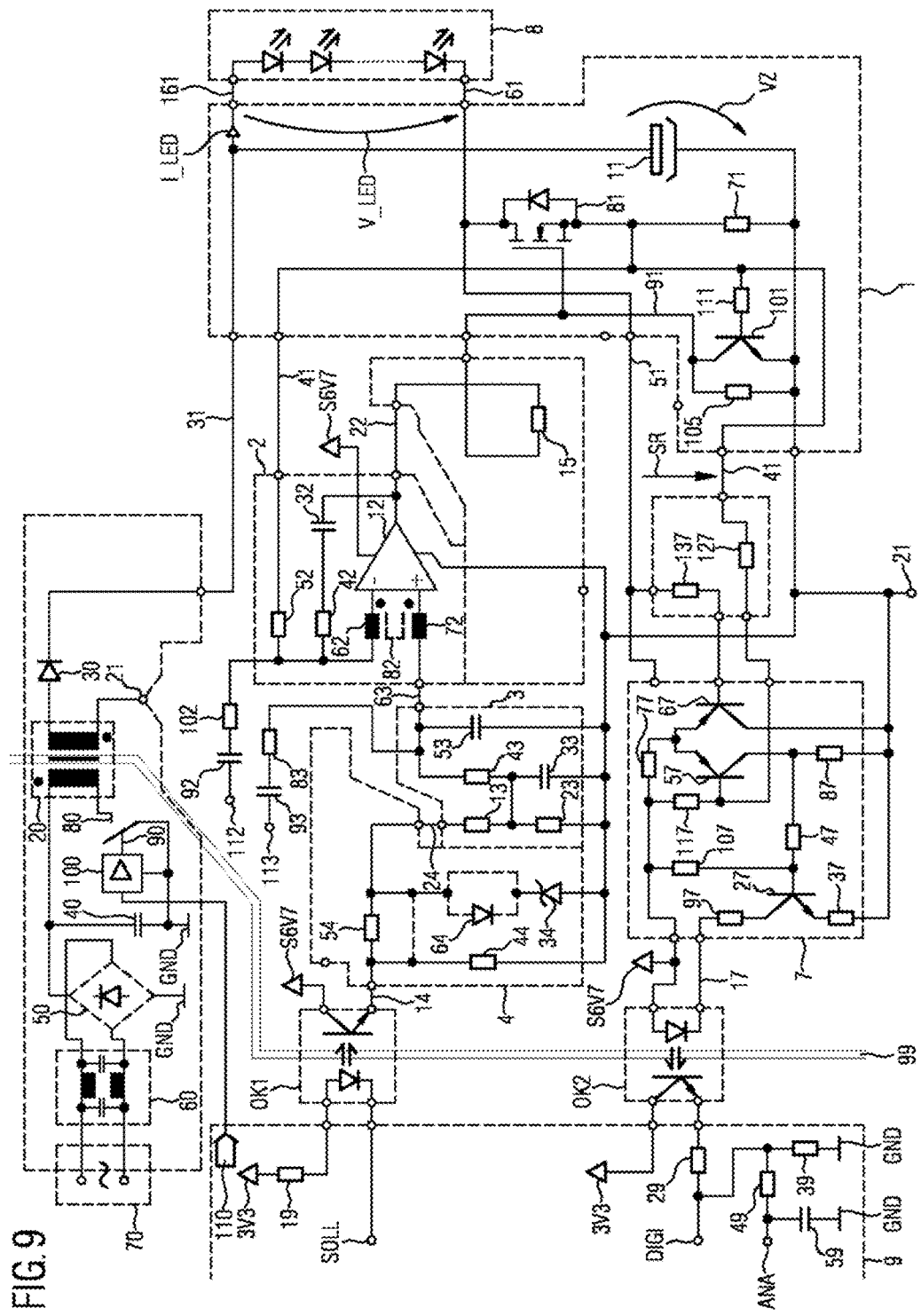
FIG. 9 shows an improved circuit variant for the same output stage as in FIG. 8.

FIG. 9 further develops the exemplary embodiment described so far. In particular, the detection circuit 7 is designed in more detail. The inverting bipolar transistor 27 together with the base series resistor 47 now represents only one output stage, which comprises a differential amplifier, a subtracting transistor 57, an adding transistor 67 and a current source resistor 77. The latter is supplied by the same auxiliary voltage S6V7 on the output side as the transmitting diode of the second optocoupler OK2. A terminating resistor 87 is connected in series between the collector of the subtracting transistor 57 and the circuit ground 21 on the output side and is thus parallel to the already known series circuit consisting of base series resistor 47, the base-emitter path of the inverting transistor 27 and softening resistor 37. This is because the base series resistor 47 is connected directly to the output of the differential amplifier, i.e. to the collector of the subtracting transistor 57. If, as is common in comparators or operational amplifiers, a current mirror were placed opposite the differential amplifier, the output of such an overall arrangement would be at the collector of the adding transistor. A protective resistor 97 is connected between the transmitting line 17 and the collector of the inverting transistor 27, and a balancing resistor 107 connected to the auxiliary voltage S6V7 helps to set the operating point for transistor 27.

The purpose of this further development is, firstly, to map the limit G more sharply and, in particular, to be able to make it lower than a base-emitter forward voltage, and, secondly, to make the voltage signal for the headroom SR independent of the current output current I_LED. To achieve the latter, this very voltage across the current measuring resistor 71 should be subtracted from the voltage on the second feedback line 51, which, as already mentioned above, corresponds to the sum of the operating voltage of the linear amplifying transistor 81, i.e. the actual headroom, and the voltage across the current measuring resistor 71 as a measuring signal on the first feedback line 41 and is thus output current dependent. The previously described differential amplifier 57+67 in the detection circuit 7 is responsible for this. For its operation, the line 41 is also led out at another point of the post-regulator 1 and coupled to the base of the subtracting transistor 57 via a subtracting series resistor 127. The second feedback line 51 is coupled to the base of the adding transistor 67 via an adding series resistor 137. The subtraction of the current measuring voltage on line 41 is an "inherited advantage" and can also be omitted by connecting the left end of the subtracting series resistor 127 to the circuit ground 21 on the output side instead of to the current measuring resistor 71 (not shown).

This is because the voltage divider consisting of a reference resistor 117 and the subtracting series resistor 127 primarily defines the limit G according to the formula $G = S6V7 * R_{127}/(R_{117}+R_{127})$, according to which very low limits G can also be represented with a correspondingly low impedance subtracting series resistor 127, likewise lower than a diode forward voltage, as is particularly advantageous for linear regulators as post-regulators 1. Towards the end of the description of FIG. 5 it is stated that such a limit can be 0.5 V. The desired sharpness of the limit detection is assumed by the differential amplifier in the following way: If the headroom SR in the form of the voltage on the second feedback line 51 becomes larger than the limit G, the emitters of both differential amplifier transistors 57 and 67 follow this upward movement, which causes the transistor 57 to switch on. This also switches on the inverting transistor 27 and sends a current of magnitude $S6V7/(R_{97}+R_{37})$ through the second optocoupler OK2 when the softening resistor 37 is very low impedance or zero. If the headroom SR becomes lower than the limit G, both emitters follow this downward movement again, which leads to the transistor 57 and thus also the transistor 27 being switched off, which ends the transmission. Exceeding the limit G by the headroom SR is detected here much more sharply and reported back to the control circuit 9 than in the circuit as shown in the previous figure. A softening of this detection, which as already described can also be useful here, is achieved by a more high impedance softening resistor 37 and current source resistor 77 as well as by a more low impedance terminating resistor 87. The advantage of the free adjustability of the limit G by means of resistors 117 and 127 remains.

In case of a short circuit between the output connections 31 and 61 of the post-regulator 1, controller 2 is unable to control the gate voltage 91 down quickly enough. At the same time, a voltage corresponding to a high short-circuit current drops across the current measuring resistor 71, which voltage can exceed 1 V. This is because ultimately—only slowed down by the impedance of the short circuit itself—the intermediate circuit capacitor 11 is discharged via the current measuring resistor 71. Then a circuit consisting of a series resistor 111 and a protection transistor 101 intervenes because the voltage across the measuring resistor 71 parallel thereto becomes larger than a base-emitter forward voltage. The protection transistor 101 thus becomes low impedance and pulls the gate voltage 91 against the circuit ground 21 on the output side, as a result of which the amplifying transistor 81 becomes high impedance particularly quickly and thus protects the post-regulator 1 from destruction. In order not to overload the output 22 of the controller 2, in contrast to the previous figure, here the matching resistor 15 should no longer be bridged. A second matching resistor 105 parallel to the working path of the protection transistor 101 forms a voltage divider with resistor 15 in front of the gate 91, with which the controller output voltage 22 can still be attenuated somewhat in normal operation.

Figure 10:
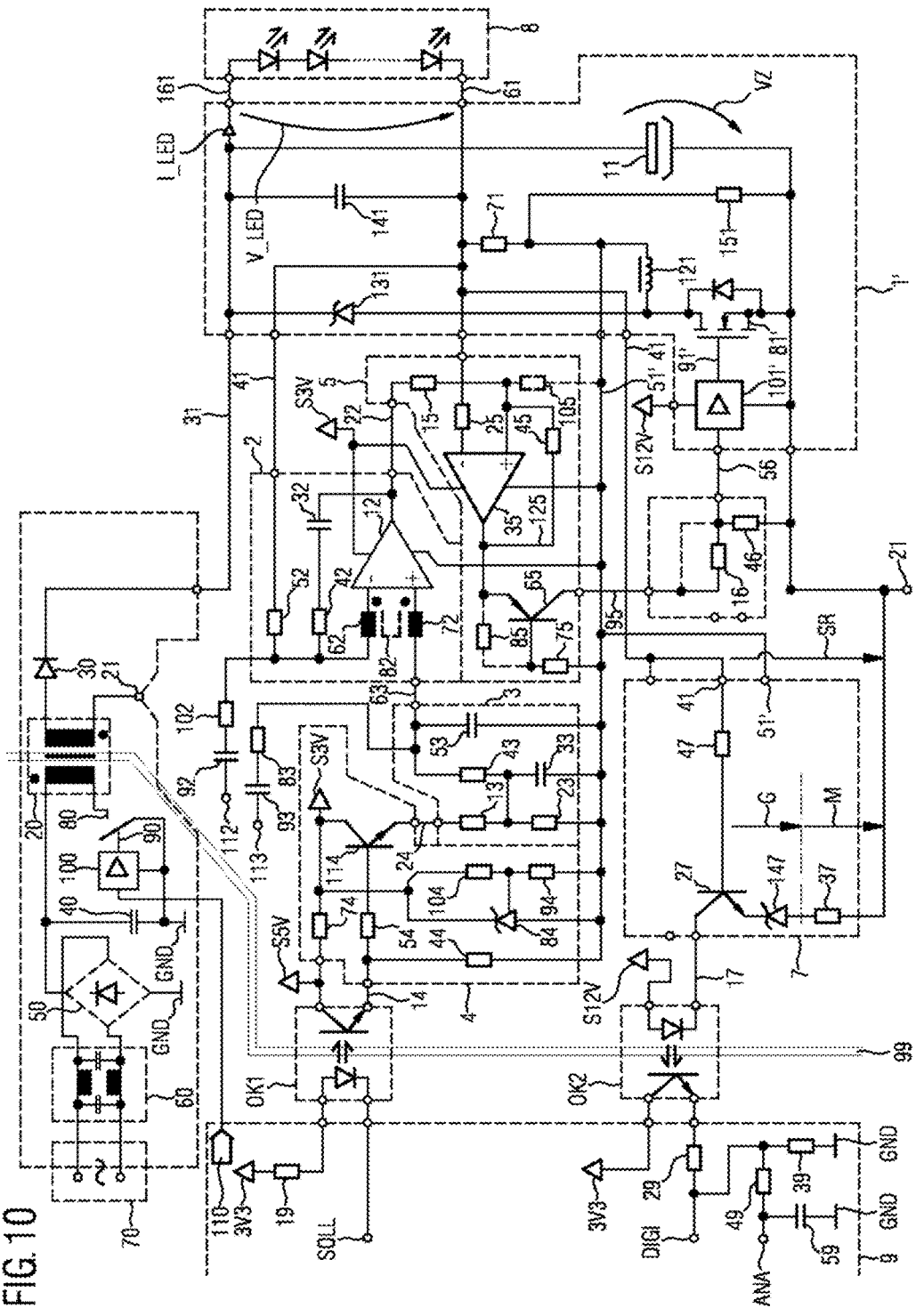
FIG. 10 shows a first circuit variant for the output side of the operating device with a clocked buck converter as post-regulator.

FIG. 10 segues into the clocked post-regulators 1', which, as already deduced, as a matter of principle comprise a buck converter, since this is the only converter topology that makes sense at this point, which behaves like a linear regulator over the entire operating range, which in particular can statically connect its input to its output without any headroom and without clocking. The advantage of such clocked post-regulators is their significantly lower losses compared to their linear counterparts, and on top of that they are much more independent of their headroom. Nevertheless, it still makes a lot of sense to keep the headroom small. Because of the particularly small spread between the input and output voltage of such buck converters, they can be operated particularly advantageously even in continuous operation (Continuous Conduction Mode=CCM), as the particularly lossy diode conduction phases then become particularly short. Conversely, the clock frequencies are higher than in the so-called limit operation (CRitical conduction Mode=CRM or Transient Conduction Mode=TCM) and much higher than in the even lower-frequency discontinuous operation (Discontinuous Conduction Mode=DCM), provided the ambient parameters are otherwise the same. Because the voltages across a buck converter coil or "buck choke" 121 are significantly smaller and, above all, reliably constantly smaller at all possible operating points-their positive amplitude corresponds to the headroom—than in corresponding circuits with a fixed intermediate circuit voltage that is designed for the highest possible output voltage, here the buck converter coil 121 can be selected to be up to five times smaller than there. Here, an EF16 or EF20 structure can be replaced by a "yarn core spool" 121. The above linear amplifying transistor 81 here becomes the clocked power transistor 81', which is advantageously of the same type, and swaps the order with the current measuring resistor 71. The measuring resistor is now connected in series to the drain terminal of the power transistor 81' and thus directly to the negative connection 61 of the post-regulator 1'. If a clocked power transistor 81' and a buck converter coil 121 are present, a flyback diode 131 can also be required. In order to improve its output variables, the entire clocked topology is terminated by the smoothing capacitor 141, which directly connects the two output connections 31 and 61. Because the intermediate circuit capacitor 11 should terminate the input of each buck converter even according to converter theory, the intermediate circuit capacitor 11 is more important for post-regulator 1' than for linear regulator 1 above. It is particularly advantageous if the intermediate circuit voltage VZ, which is generated and maintained by a first clocked converter as an isolating and power factor correcting input stage, is applied to the input of the buck converter. Here, the gate line 91' carries an amplified and clocked control voltage that comes from the gate driver 101'. This raises a control signal 56 with levels less than 7 V at its input to a level of 12 V, which is why it is supplied by a higher secondary auxiliary voltage S12V. This higher auxiliary voltage also advantageously supplies the transmitting diode of the second optocoupler OK2, the reason for which will be explained in more detail later.

As the existing auxiliary voltage S12V on the output side is too high for controller 2, a second, much lower auxiliary voltage S3V on the output side is generated to supply the amplifier 12 contained therein in order to reduce its losses.

Continuously operated buck converters with a small spread, i.e. a small difference between input and output voltage, are particularly advantageously controlled via a so-called hysteresis band, whereby the necessary pulse pattern for the control signal 56 is generated directly. This requires a pulse generator 5 which contains a comparator 35 as the central and only active part, which, like the amplifier 12, can be designed as an operational amplifier. It is particularly advantageous that the pulse generator 5 is also supplied by the lower auxiliary voltage S3V. A double component with two identical amplifiers can then be used for the controller and the pulse generator at the same time. The measuring voltage across the current measuring resistor 71 is now superimposed with a slope generated by the buck converter coil 121, which can result in an intersection with the controller output voltage 22. If the comparator with an output voltage 125 is made into a Schmitt trigger by positive feedback of the output voltage via a hysteresis resistor 45 to the positive input of the same comparator, to which the controller output 22 is also connected as a reference via the already known matching resistor 15, the necessary hysteresis band is created. Its height corresponds to the height of the hysteresis of the Schmitt trigger, which is defined, inter alia, by the ratio between the hysteresis resistor 45 and the matching resistor 15. The higher the hysteresis, the lower the clock frequency of the continuously operated buck converter 1' will be. With a symmetrical supply, i.e. with, for example, −3 V instead of circuit ground 21 at the negative supply terminal of the comparator 35, the hysteresis can be symmetrical to a reference voltage, which here is given by the controller output voltage 22. Above this reference voltage, there is an input voltage 41 at the negative input of the comparator 35, which can also be called the measuring input, from which the output voltage 125 of the comparator flips approximately to its negative supply voltage. This so-called flip down voltage is referred to as V_down. Precisely because of this flipping to one edge of the supply, unlike with the linear operational amplifier 12, the value of V_down also depends on the level of the auxiliary voltage that supplies the comparator 35, in this case on the 3 V of the second and smaller auxiliary voltage S3V on the output side. According to the relevant literature, the exact value of the flip down voltage V_down depending on all necessary parameters is given by the equation $$V\_down = (R_{45}U_{22} + R_{15} * 3 \text{ V})/(R_{45} + R_{15})$$

As with the linear operational amplifier 12, the resistance before the positive feedback, i.e. the matching resistor 15, plays a decisive role here too, and the denominator of the equation here, as there, is the sum of both resistors involved in feedback (negative or positive feedback). A so-called flip up voltage V_up, which is applied at a low level of the comparator output 125 at its positive input, which can also be called the reference input, and which the input voltage 41 should fall below so that the comparator output 125 flips back to the positive supply voltage S3V, would result from the same equation if the comparator 35 is supplied symmetrically and the plus sign in the numerator is replaced by a minus sign. In the absence of the negative part of the auxiliary voltage S3V here, there is a monopolar supply, the calculation is simplified to $$V\_up = R_{45}U_{22}/(R_{45} + R_{15})$$

and the hysteresis is asymmetrical with respect to the controller output voltage 22, which acts as a reference voltage. The height of the hysteresis results with $$V\_down - V\_up = R_{15} * 3 \text{ V}/(R_{45} + R_{15})$$

to a value which, apart from the constant "3 V"=S3V, essentially only depends on the value ratio $R_{15}/R_{45}$ of the matching resistor to the hysteresis resistor, in particular if the hysteresis is small compared to the auxiliary voltage. In this case, the hysteresis resistor 45 should be selected with a very high impedance. From the same consideration it follows that the flip up voltage V_up is only just below the value $U_{22}$ of the controller output voltage 22, because the large value of $R_{45}$ in the penultimate equation is dominant.

A comparator designed in this way is suitable as a hysteresis band control if the same signal 41 which is output as an actual value to the feedback resistor 52 of the controller 2 is also used as the input voltage 41 for the comparator 35 of the pulse generator 5, optionally adjusted by an intermediate resistor 25. The second matching resistor 105, which occupies a different position compared to the previous figure, can, as there, also possibly reduce the level of the reference voltage here. Because the current through the buck converter coil 121, represented by the voltage across the current measuring resistor 71 as the actual value, is sawtooth-shaped and thus periodically alternately higher or lower at the clock frequency of the post-regulator than the desired smooth actual value I_LED, which in turn should correspond to the setpoint 63 for the controller 2, the operation of the buck converter comprised in the post-regulator 1' is perfectly simulated by the structure of the pulse generator 5, which makes it suitable in principle for hysteresis band control. The correspondence between I_LED and setpoint 63 is established by using the controller output voltage 22 as a reference for the comparator 35 in the pulse generator 5, which has been converted to a Schmitt trigger. Not only the above asymmetry of its hysteresis, but also possible static effects of extreme duty cycles in the control signal 56 for the gate driver 101' with the clock frequency of the buck converter are compensated by the integrating capacitor 32 of the PI controller 2. Since this clock frequency is ultimately defined by when the measured current through the buck converter coil 121 leaves the hysteresis, this ultimately results in the expression $$f_{1'} \sim R_{15} * 3 \text{ V}/((R_{45} + R_{15})L_{121})$$

as a reference point for the clock frequency f1 of the buck converter in the post-regulator 1'.

Swapping the order between the power transistor 81' and measuring resistor 71 in the post-regulator 1' results in a new reference potential 51' for controller 2 and, due to the high signal interconnection, also for pulse generator 5, low-pass filter 3 and voltage shaper 4. The end of the current measuring resistor 71 connected to the buck converter coil forms this new reference potential 51', and instead of the second feedback signal 51, the input voltage 41 for the comparator 35 in the pulse generator 5 is now generated at the same point, which voltage is simultaneously applied on the first feedback line 41. This is because the upper end of the measuring resistor 71 is connected to this line. In order for the entire circuit to be able to start at all, a starting resistor 151 is also provided, which extends from the lower end of the measuring resistor 71 to the circuit ground 21 and therefore pulls apart all potentials on the output side in the first milliseconds after the operating device is started.

The new reference potential 51' is located around the headroom SR above the circuit ground 21 on the output side, strictly speaking reduced by the voltage across the current measuring resistor 71, which is not a problem because the first optocoupler OK1 connected to the voltage shaper 4 can isolate a slightly different voltage than the second optocoupler OK2 which is controlled by the detection circuit 7, which is still referenced to the circuit ground 21 on the output side. Only the output 125 of the comparator 35 requires a level shift stage in order to be able to switch the lower located gate driver 101 on and in particular off. A pnp level shift transistor 65 performs this task if its emitter is connected to the comparator output 125 and drives the collector 95 upwards via a driver resistor 75 between its base and the new reference potential 51' when the voltage 125 assumes a positive level. Thus, the control signal 56 at the input of the gate driver 101' also becomes positive, transmitted by a series resistor 16, which can also be bridged. A quenching resistor 85 facilitates the switching off again of the level shift transistor 65, as a result of which its collector 95 becomes high impedance. A switch-off resistor 46 then pulls the control signal 56 together with the collector against circuit ground 21, which reliably switches the gate driver 101' off again. In its switched-off state during normal operation, the level shift transistor 65 should therefore only be able to block the headroom SR, in the event of an output short circuit briefly block the intermediate circuit voltage VZ, and the switch-off resistor 46 can also be connected directly to the collector 95 of the level shift transistor 65 (not shown).

The detection circuit 7 is identical to that shown in the penultimate figure, including all external signal connections, except that a Zener diode 147 is now connected between the emitter of the inverting transistor 27 and the softening resistor 37, with its anode being connected to the resistor and its cathode to the transistor. In this way, the fixed built-in limit G increases, which now corresponds to the sum of a diode forward voltage of the base-emitter diode of the transistor 27 and the Zener voltage of the diode 147. As already mentioned, with clocked post-regulators 1' the headroom SR no longer needs to be minimal, but a slightly larger headroom is permissible and sensible. Because of the voltage across the Zener diode 147. the supply voltage for the inverting transistor 27 on the transmitting line 17 should also be higher, which is why the transmitting diode of the second optocoupler is supplied by the new auxiliary voltage S12V on the output side, which is particularly advantageously 12 V and is already used for the gate driver 101'. Due to the change in order just explained, the feedback line is called 41 here and no longer 51 as in the second to last figure, but is connected to the negative output connection 61 in exactly the same way as there.

However, here the voltage shaper 4 is significantly further developed and is supplied by a third new auxiliary voltage S5V on the output side, which advantageously is 5 V or slightly more. It even comprises a cascading of the second new auxiliary voltage S3V, because said second new auxiliary voltage is generated here in a voltage limiter, comprising a decoupling resistor 74, a controllable Zener diode 84 (e.g. a TL431) and a voltage divider consisting of the resistors 94 and 104, from the third auxiliary voltage S5V in the first place at a level of 3 V, which is particularly advantageous. This voltage is set via the divider consisting of resistors 84 and 104, with its tap usually being 2.5 V above the new reference potential 51'. The voltage limiter replaces the Zener diode 34 of both previous figures, in conjunction with a pulse transistor 114. Its collector is connected to the second new auxiliary voltage S3V, and its emitter is identical to the input signal 24 for the following low-pass filter 3. Because its base voltage can be higher than its collector voltage, the pulse transistor is saturated as long as it is supposed to transmit a pulse. As a result, it produces only a very small and, above all, very constant forward voltage. The difference between the base and collector voltage is absorbed by the already known resistor 54, and the already known pull-down resistor 44 ensures that the pulse transistor 114 is switched off and that there is a reliable zero on the input signal 24 between the pulses. Unlike shown, said pull-down resistor can also extend directly from the base of the pulse transistor 114 to the new reference potential 51'.

However, the circuit shown in FIG. 10 runs into problems if its output current I_LED is to be particularly small, although the asymmetry of the hysteresis of the Schmitt trigger 35 in the pulse generator derived above actually helps in this regard. This is because its input 41 only has to be slightly below the reference 22 in order to cause the comparator 35 to flip up again. However, if the reference 22 with voltage value $U_{22}$ is barely greater than zero due to the tiny required output current, the resolution for the flip up voltage is completely lost according to the equation V_up=$R_{45}$ $U_{22}$/($R_{45}$+$R_{15}$) derived above. To put it bluntly, the negative supply voltage for the comparator 35 is missing.

Figure 11:
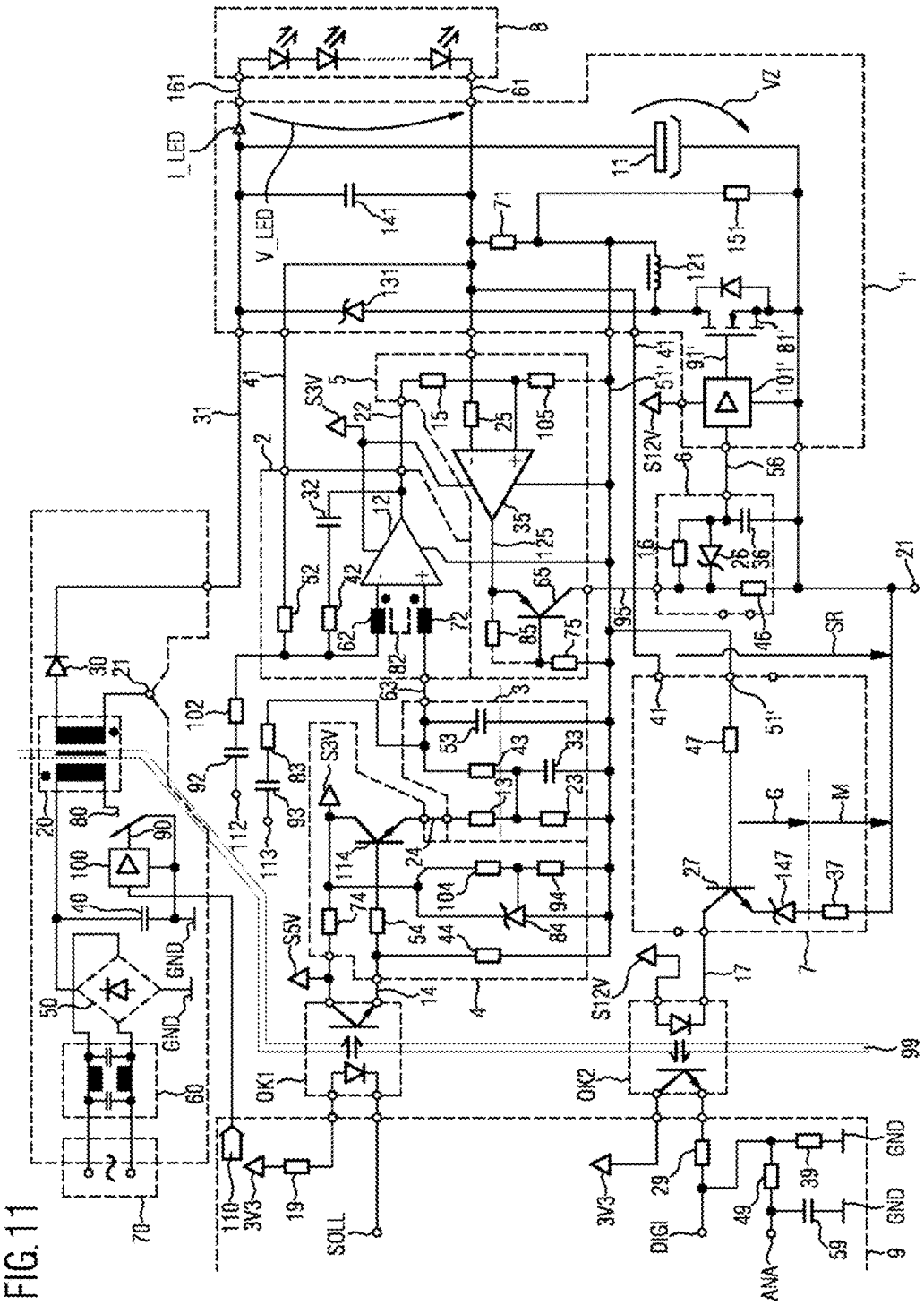
FIG. 11 shows a second circuit variant for the same output side as in FIG. 10.

FIG. 11 solves this problem by firstly removing the positive feedback 45 and thus the Schmitt trigger characteristic of the comparator 35 in the pulse generator 5. Its hysteresis is virtually infinitely small, and when equal potentials 41 and 22 are input, i.e. when the output side-which is the purpose of the whole thing—is in a static steady state, the comparator would switch its output 125 between S3V and zero with an approximately infinitely high frequency. In the event of a control deviation, however, its output 125 would be statically high or low, which in turn is unsuitable for direct clocking of the buck converter 1' ultimately connected to it. Therefore, secondly, a delay circuit 6 is inserted between the level shift stage following output 125 with its collector 95 and the gate driver 101'. In addition to the already known switch-off resistor 46, it comprises at least one delay capacitor 36, a delay resistor 16 and a discharge diode 26, which discharges the delay capacitor 36 via the switch-off resistor 46 significantly faster than it is recharged by a positive voltage at collector 95 via the delay resistor 16. Although this delays all switch-off commands slightly, all switch-on commands are significantly delayed. And both delay times are fixed. Therefore, a constant switch-off time control is used here instead of the hysteresis band control from the previous figure.

As a result, the system consisting of pulse generator 5, delay circuit 6 and clocked post-regulator 1' apparently always generates an output current I_LED that is too low, because at a suitable current level, the power transistor 81' is switched off, causing a drop in the current level through the buck converter coil 121, and only after the constant switch-off time has elapsed is it switched on again, with the current in the buck converter coil 121 being significantly lower. Due to the sawtooth shape of this current, the output current I_LED corresponds to the time average of the current through the buck converter coil and is therefore initially smaller than the setpoint. However, the PI controller 2 detects this and increases its output voltage 22 accordingly. The controller output 22 is therefore exactly about the amount above the setpoint 63 by which the above system generates "too little" current. This "above" contains the solution to the problem described at the beginning regarding this figure. This is because all measuring signals and other signals in controller 2 and pulse generator 5 are still above zero, even if the output current I_LED should already be almost zero.

The mean value control from the previous figure has become a peak current control here in FIG. 11, more precisely a control by switching off when a peak current is detected, because the buck converter 1' can also be operated continuously. And current peaks can be significantly higher than the corresponding average value. This effect is exploited here and leads to significantly improved system properties for another reason. The current drop in the buck converter coil is defined by the output voltage between connections 31 and 61 and is significantly steeper than the current increase at the same point. This is because this current increase is determined by the headroom SR, which is in any case smaller than the output voltage, in many cases even smaller by factors. Assuming constant levels of the maxima and minima in the buck converter coil current, this results in a switch-off time period for the power transistor 81' that is shorter or even significantly shorter than its switch-on time period, which two time periods follow one another alternately by clocking. It is not only more advantageous to fix a shorter time period in a circuit, here in the delay circuit 6, but also the one which results from a fixed value, here from the output voltage which is permanently impressed by a load 8 which, for example, consists of at least one series circuit of LEDs. On the other hand, the switch-on time period now controlled by the control is not only the one that is based on the constant but ultimately controlled headroom SR, but above all the one that directly determines the peak current in the buck converter coil, from which the required output current I_LED is generated after smoothing.

In contrast to all previous circuit figures, the input of the detection circuit is not connected directly to the headroom SR in the form of the lines 51 or 41, but to the new reference potential 51'. As is known, this is below the headroom SR by the voltage across the current measuring resistor 71. At an output current I_LED=1 A, the difference between the two is only 0.1 V, which is superimposed on a sawtooth-shaped ripple with a maximum amplitude of 0.025 V caused by the clocking of the buck converter. This ripple is negligible at first glance.

At second glance, it even becomes a feature. Detection circuits are designed to detect things that are not there or are already there. Because they always have repercussions on the things that are to be detected, whenever the thing to be detected is barely distinguishable from its absence, linear and quasi-stable intermediate stages can develop that run counter to sharp detection. If a ripple is superimposed on the thing to be detected, here a voltage, the distinguishability is increased and the detection circuit can report a new state "thing detected" in a time-discrete manner synchronously with the frequency of this ripple.

The generalization of this detail means that all circuit blocks shown in FIGS. 7 to 12 can be interchanged, although not in their general configuration according to FIG. 7, but certainly with one another. In particular, a further developed detection circuit 7 from FIG. 9 can also be used in FIGS. 10 to 12 or an improved voltage shaper 4 from FIG. 10 can also be used in FIGS. 8 and 9.

Figure 12:
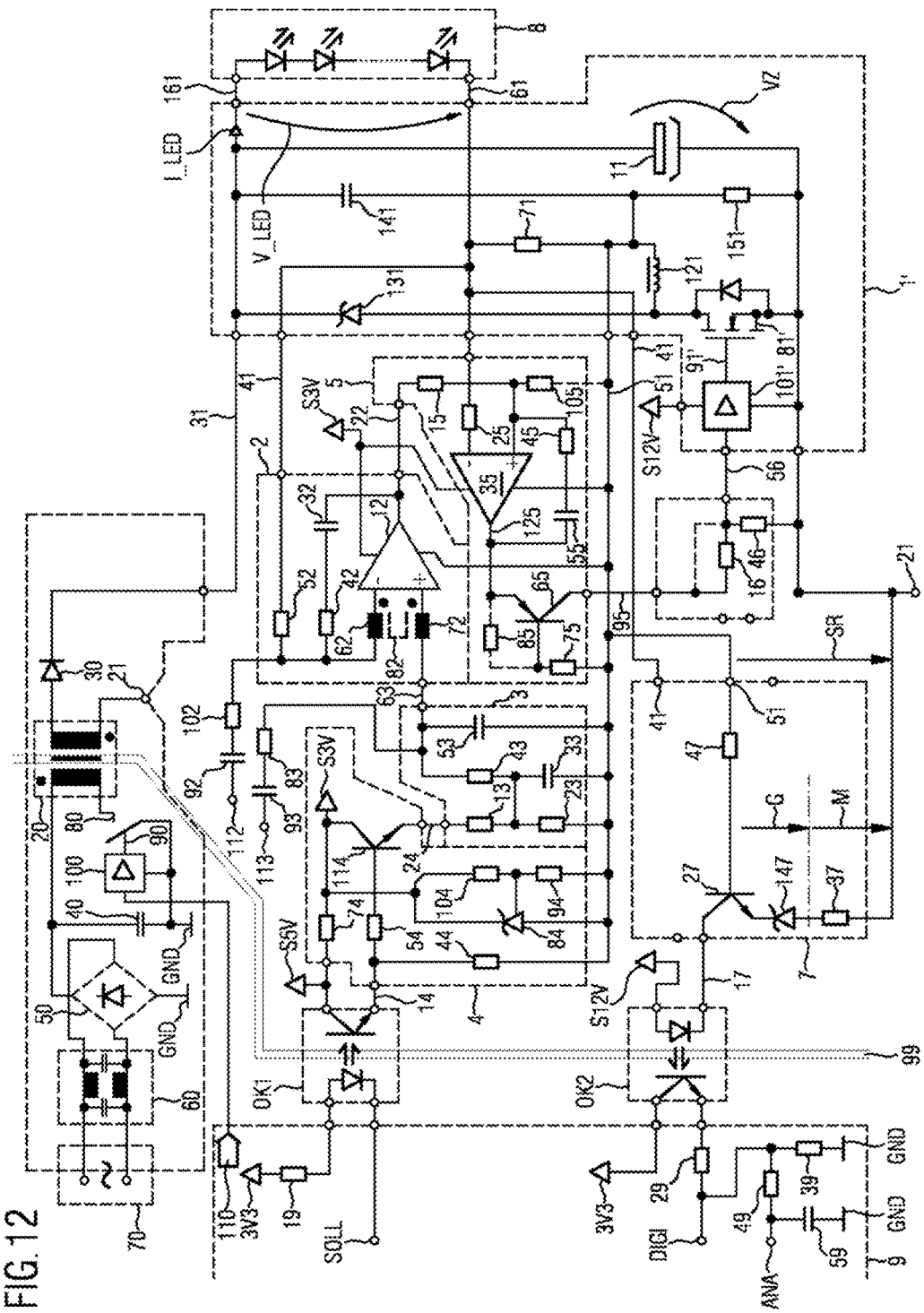
FIG. 12 shows a third circuit variant for the same output side as in FIG. 10.

FIG. 12 offers another solution, which also works for loads other than LED loads, for the problem of FIG. 10, which is very similar to this figure. However, the connection of the measuring resistor 71 in the clocked post-regulator 1' is different from the two previous figures. Here in FIG. 12, it no longer measures the buck converter coil current, but only directly the output current I_LED, because the filter capacitor 141 is connected "below" the measuring resistor, so to speak. As a result, the new reference potential 51 for the circuit blocks 2, 3, 4 and 5 migrates to the lower end of the filter capacitor 141, which is now located exactly about the headroom SR above the circuit ground 21 on the output side. Conversely, the potential of the negative load connection 61 is now applied unfiltered to the first feedback line 41 for the controller 2 and at the same time supplies the negative measuring input 41 for the comparator 35.

However, the voltage at this input 41 lacks the ripple caused by the buck converter coil. In order for the pulse generator 5 to be able to generate a clock signal from the comparison of the two relatively smooth voltages 22 and 41, it has a positive feedback as in FIG. 10 so that the comparator 35 can actually flip somewhere. When the output level is high, a constant current flows through the hysteresis resistor 45 from output 125 in the direction of reference 22, and when the output 125 is at zero potential, a reverse constant current flows along the same path from the reference to the output. Secondly, the positive feedback should also be frequency-determining, which is why a clock capacitor 55 is inserted in series with the hysteresis resistor 45 in FIG. 12. Due to the new serial clock capacitor 55, the just described currents in the positive feedback generate exponentially ramp-shaped voltages at the reference input of the comparator 35, resulting in intersections with the input voltage 41 at the measuring input, which lead directly to the formation of a clock at the output 125 of comparator 35. Because of the clock capacitor 55, negative voltages can occur at the reference input even with a monopolar supply, which can still be correctly evaluated by the comparator 35. This avoids the loss of resolution described in FIG. 10 at very small reference voltages 22.

Figure 13:
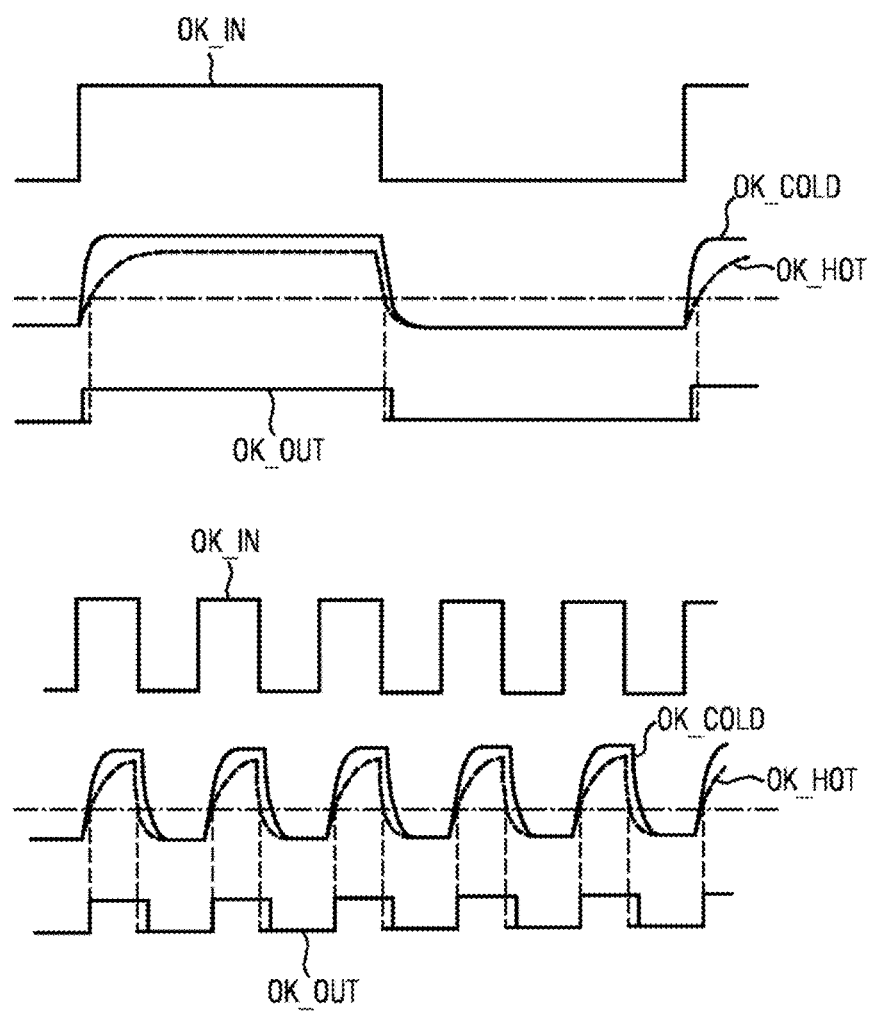
FIG. 13 shows a temperature drift of a clocked optocoupler at lower and at higher clock frequencies.

FIG. 13 helps to answer the so far unanswered question of which frequencies the two optocouplers OK1 and OK2 are operated at. The feedback on the headroom SR is either purely digital, namely whether the headroom is currently larger or smaller than a given limit G, or mixed digital-analog, where in the time periods in which the limit G is exceeded, the measure M of the excess is also fed back. As a mains hum is almost always superimposed on the headroom SR, said mains hum also defines the frequency for the feedback by OK2, i.e. a feedback frequency, as it almost always causes the limit to be exceeded. The specified control method corresponds to that of a two-point controller, which, however, does not act on a mainly integrating system as is usual, but on a mainly proportional or linear system. For this purpose, the curve between two points, where a lower point signals "headroom SR<limit G" and an upper point signals "headroom SR>limit G", i.e. the curve of the signal DIGI, should first be low-pass filtered. Strictly speaking, the average value of the signal DIGI should be determined, which in relative form corresponds to the determination of its duty cycle. All these filtering, detections or determinations are carried out by the control circuit 9 which is concentrated on the input side of the operating device.

An exception to the feedback frequency is a very low output current I_LED. Then the mains hum disappears almost completely from the headroom SR, which is now permanently on the limit G, so to speak, and has also become very soft due to a lack of power input and output, and other artifacts in its voltage can cause its limit G to be exceeded. Although the feedback frequency can be almost arbitrary at very small output currents I_LED, the basic principle of the control method is still maintained, in particular in its purely digital form, which is why it is particularly advantageous. As long as any pulse pattern is fed back via the second optocoupler OK2, the headroom setting via the power factor correcting input stage works as described, only with almost no power, and if a continuous high level is fed back, the input stage switches off completely during this duration. Otherwise, the feedback frequency for OK2 is defined by twice the frequency of the existing AC power supply network and is typically 100 Hz.

The frequency for the setpoint transmission via the first optocoupler OK1, i.e. a setpoint frequency, can either be exactly synchronized to the feedback frequency, which, however, becomes arbitrarily complicated with very small output currents I_LED. Or it is chosen to be constant and maximally asynchronous, for which, for example, the prime number ratio 5:7 is particularly suitable. The setpoint frequency can then be 140 Hz, but can also be lower than the feedback frequency. The distance to the feedback frequency should be large enough to avoid beats. However, the physical properties of an optocoupler should also be taken into account, in particular its dynamic and thermal properties.

The upper trio of graphs shows a purely digital optocoupler transmission at low frequency, at the top a rectangular input signal OK_IN and in the middle a resulting analog output signal OK_COLD in solid lines for a cold optocoupler or OK_HOT, which is shown in dashed lines and is generated by a hot optocoupler. Thirdly, a reference level is shown in dash-dot lines with which the analog output signals are compared in order to arrive at the digital output signal OK_OUT of the third graph. Comparing the third and first graphs shows that each optocoupler naturally transmits with a slight delay, but also that the transmitted pulses become shorter the hotter the optocoupler becomes. If a pulse-pause ratio contains the information of the signal, as is the case with purely digital transmission, the observed pulse shortening is a clear distortion of information.

The lower trio of graphs shows the same situation at five times the frequency. The pulse shortening with a hot optocoupler is the same per pulse when measured absolutely, but it distorts five times more because the pulses themselves are significantly shorter. This effect is even visible to the naked eye. It follows that the setpoint frequency should be chosen to be as low as possible. The feedback frequency of usually 100 Hz already represents something like an ideal point, which is why the setpoint frequency should not be much higher, for example 140 Hz. A further advantage of such low signaling frequencies is a particularly high signal resolution in the control circuit 9 on the input side, which operates with a constant and, in particular, limited clock frequency. Since in purely digital transmission the value of the transmitted signal should be obtained from the distances between its edges, the resolution on the input side is higher the further apart the edges are in time, i.e. the lower the setpoint frequency is.

When controlling the headroom SR, an inherent slowness due to such low setpoint frequencies does not play a role, since the controller on the input side, which is not described further for the sake of general familiarity, should be set much slower for a first clocked converter that is to operate as a power factor correcting input stage. Otherwise the power factor correction will not work. However, the lower limit for the setpoint frequency at which the setpoint for the output current I_LED is transmitted via the first optocoupler OK1 is determined by the low-pass filter 3. Said low-pass filter should filter as well as possible without becoming arbitrarily sluggish, because it should also be able to transmit setpoint changes, which are particularly common with LiFi. Therefore, this filter 3 is designed as a two-stage low-pass filter, as shown unchanged in all FIGS. 7 to 12. This is because any remaining ripples in the setpoint signal 63 on the output side of the specified operating device are passed on to the output current I_LED almost undamped by the very fast and direct control of the post-regulator 1 or 1' and should not exceed small percentage values of the average value of the same current. By inference, the same percentage values also apply to the ripple of the setpoint signal 63 and thus limit the setpoint frequency downwards.

All this results in the optimum of transmitting the setpoint for the output current I_LED at 140 Hz or 145 Hz, for example. In at least one example, the setpoint frequency ranges from 30 Hz to 1 kHz, particularly advantageously from 60 Hz to 170 Hz.

The fine adjustment of the headroom voltage depending on the current internal situation of the device is described below. This fine adjustment is used in all the above-mentioned embodiments. The current internal situation of the device depends largely on the thermal situation in the device, which in turn depends on the output current and the output voltage. However, the current internal situation of the device may also depend on the number of operating hours and the associated aging of critical components (e.g. electrolytic capacitors).

If the power loss in the post-regulator is below the critical limit, e.g. due to an output current of less than 90% of the maximum output current, or if the temperature measured by the microcontroller with an NTC resistor is below the critical limit of 110% to 120 C at the critical components of the post-regulator (this is usually the transistor connected as a linear regulator if the post-regulator is designed as a linear regulator, or the buck converter coil or buck choke if the post-regulator is designed as a clocked buck converter), the microcontroller increases the headroom voltage by means of the intermediate circuit voltage in the fine adjustment range up to an upper value, so that the power loss in the circuit arrangement and especially in the post-regulator is increased up to a predetermined limit in order to minimize the ripple of the output current, so that the following dimensioning rule applies to the ripple of the output current:

The amplitude modulation of the output current =

(maximum output current − minimum output current)/

(maximum output current + minimum output current)

should be less than 3%.

If the power loss in the post-regulator is above the critical limit, e.g. due to an output current greater than 90% of the maximum output current, or if the temperature measured by the microcontroller with an NTC resistor is above the critical limit of 110° C. to 120° C. at the critical components of the post-regulator (this is usually the transistor connected as a linear regulator if the post-regulator is designed as a linear regulator 1, or the buck converter coil if the post-regulator is designed as a clocked buck converter 1'), the microcontroller reduces the headroom voltage by means of the intermediate circuit voltage in the fine adjustment range to a lower value, so that the power loss in the circuit arrangement and especially in the post-regulator is reduced in order to increase the ripple of the output current, so that the following dimensioning rule applies to the ripple of the output current:

The amplitude modulation of the output current =

(maximum output current − minimum output current)/

(maximum output current + minimum output current)

should be greater than 5% and less than 10%.

If the number of operating hours is above the critical limit of 40,000 h and the power loss in the post-regulator is above the critical limit, e.g. due to an output current greater than 90% of the maximum output current, or if the temperature measured by the microcontroller with an NTC resistor is above the critical limit of 110% to 120° C. at the critical components of the post-regulator (this is usually the transistor connected as a linear regulator if the post-regulator is designed as a linear regulator, or the buck converter choke if the post-regulator is designed as a clocked buck converter), the microcontroller reduces the headroom voltage by means of the intermediate circuit voltage in the fine adjustment range to a lower value, so that the power loss in the circuit arrangement and especially in the post-regulator is reduced in order to increase the ripple of the output current, so that the following dimensioning rule applies to the ripple of the output current:

The amplitude modulation of the output current =

(maximum output current − minimum output current)/

(maximum output current + minimum output current)

should be greater than 10% and less than 15%.

LIST OF REFERENCE NUMERALS (ONLY CONTAINS PURE NUMERALS)

1 linear post-regulator
1' clocked post-regulator
11 intermediate circuit capacitor
21 circuit ground on the output side
31 positive pole of an intermediate circuit voltage
41 first feedback line
51 second feedback line
51 new reference potential on a feedback line or new feedback line
61 negative pole of an output voltage or negative connection for a connectable load
71 current measuring resistor
81 linear amplifying transistor
81' clocked power transistor
91 gate or gate line or gate voltage of the linear amplifying transistor
91' the same for the clocked power transistor
101 protection transistor
101 gate driver
111 base series resistor
121 buck converter coil
131 flyback diode
141 filter capacitor
151 starting resistor
161 positive pole of the output voltage or positive connection for a connectable load
2 PI controller
12 operational amplifier
22 controller output or controller output voltage or reference voltage
32 integrating capacitor
42 negative feedback resistor
52 feedback resistor
62 first small inductor
72 second small inductor
82 possible coupling of the small inductors through a common ferrite bead
3 two-stage low-pass filter
13 upper voltage divider resistor
23 lower voltage divider resistor
33 filter capacitor
43 intermediate resistor
53 smoothing capacitor
63 setpoint
4 voltage shaper
14 receiving line
24 output signal of the voltage shaper or input signal for the low-pass filter
34 Zener diode
44 pull-down resistor
54 series resistor
64 forward diode
74 decoupling resistor
84 controllable Zener diode (e.g. TL431)

94 lower voltage divider resistor
104 upper voltage divider resistor
114 pulse transistor
5 pulse generator
15 matching resistor
25 input resistor
35 comparator or second operational amplifier
45 hysteresis resistor
55 frequency capacitor
65 level shift transistor
75 driver resistor
85 quenching resistor
95 emitter of the level shift transistor or the line thereof
105 second matching resistor
125 output of the comparator
6 delay circuit
16 series resistor or delay resistor
26 discharge diode
36 delay capacitor
46 pull-down resistor
7 detection circuit
17 transmission line
27 inverting transistor
37 softening resistor
47 base series resistor
57 subtracting transistor of a differential amplifier
67 adding transistor of the differential amplifier
77 current source resistor
87 terminating resistor
97 protective resistor
107 balancing resistor
117 reference resistor
127 subtracting series resistor
137 adding series resistor
8 electrical load
9 control circuit on the input side of an operating device
19 series resistor for the transmitting diode of a first optocoupler
29 series resistor for the receiving transistor of a second optocoupler
39 parallel resistor
49 low-pass resistor
59 low-pass capacitor
99 isolation barrier
10 first clocked converter
20 isolation transformer
30 rectifying diode
40 terminating capacitor
50 mains rectifier
60 radio interference filter
70 mains input
80 actively clocked power transistor or inverter switch (symbolically shown)
90 control line of the inverter switch
100 control amplifier for the inverter switch
110 pulsed output voltage from the control circuit 9

The invention claimed is:

1. A circuit arrangement for operating a load comprising:
an input for inputting a mains power, and
an output with a positive output connection and a negative output connection for operating a load with an output current and an associated output voltage,
a first clocked converter with a SELV barrier between its primary side and its secondary side for generating a converter output current to generate an intermediate circuit voltage with a ripple on the secondary side and for controlling it to an adjustable mean value of the intermediate circuit voltage,
wherein the circuit arrangement is designed to control the first clocked converter such that the mean value of the intermediate circuit voltage is configured to follow the output voltage with a distance corresponding to the headroom voltage,
a post-regulator connected downstream of the first clocked converter for regulating the ripple on the intermediate circuit voltage generated by the first clocked converter,
a first optocoupler for transmitting information from the primary side to the secondary side via a current setpoint of the output current,
a second optocoupler for transmitting information via a headroom voltage from the secondary side to the primary side to enable control of the intermediate circuit voltage by the first clocked converter, the headroom voltage corresponding to a potential difference between the negative output connection and a circuit ground,
exactly one control circuit on the primary side for controlling the circuit arrangement,
wherein the control circuit is designed for controlling the headroom voltage to a smallest possible value in order to set a power loss in the circuit arrangement and in the post-regulator to a minimum value and at a same time configured to maintain a ripple of the output current as low as possible.

2. The circuit arrangement according to claim 1, wherein the control circuit is configured to controls the value of the headroom voltage so as to finely adjusts it as a function of the output current and/or the output voltage and/or a temperature at the circuit components and/or a number of operating hours performed such that the headroom voltage is increased in the fine adjustment range up to an upper value, so that the power loss in the circuit arrangement and in the post-regulator is increased to a predetermined limit in order to minimize the ripple of the output current.

3. The circuit arrangement according to claim 1, wherein the control circuit is configured to controls the value of the headroom voltage so as to finely adjust it as a function of the output current and/or the output voltage and/or a temperature at the circuit components and/or a number of operating hours performed such that the headroom voltage (SR) is reduced in the fine adjustment range to a lower value, so that the ripple is increased to a predetermined limit in order to set the power loss in the circuit arrangement and in the post-regulator to a smaller value.

4. The circuit arrangement according to claim 1, wherein the control circuit is designed for operating the first optocoupler purely digitally and for operating the second optocoupler either in a mixed mode, wherein the second optocoupler is configured to transmits a periodically recurring analog signal with gaps between the sections of the analog signal which are greater than zero, or the control circuit is designed for operating the second optocoupler purely digitally, wherein the second optocoupler is configured to transmits a digital signal which has a first level which corresponds in time to the gaps of the analog signal and otherwise has a second level higher than the first level.

5. The circuit arrangement according to claim 1, wherein the first clocked converter is configured to additionally operates as a power factor corrector.

6. The circuit arrangement according to claim 1, wherein the control circuit comprises a microcontroller.

7. The circuit arrangement according to claim 1, wherein the post-regulator is a linear regulator.

8. The circuit arrangement according to claim 1, wherein the post-regulator is a second clocked converter comprising a buck converter.

9. The circuit arrangement according to claim 8, wherein the buck converter is configured to be controlled by means of hysteresis band control.

10. The circuit arrangement according to claim 8, wherein the buck converter is configured to be controlled by means of constant switch-off time control after peak current detection.

11. The circuit arrangement according to claim 1, wherein the post-regulator is designed for controlling the output current to a setpoint comprising to refrain from transmitting any value of the output current back to the control circuit.

12. The circuit arrangement according claim 1, wherein the control circuit is designed for transmitting the setpoint purely digitally via the first optocoupler to the post-regulator.

13. The circuit arrangement according to claim 1, wherein the control circuit is designed for transmitting the setpoint as a duty cycle of a pulse width modulation via the first optocoupler to the post-regulator, with an associated frequency being a setpoint frequency and being in a range from approximately 30 Hz to approximately 1 kHz.

14. The circuit arrangement according to claim 1, further comprising:
a detection circuit;
wherein the circuit arrangement is designed for measuring the headroom voltage in the post-regulator and for evaluating the measurement result by the detection circuit, wherein the detection circuit is configured to emit a signal to the second optocoupler (OK2), as long as the headroom voltage exceeds a limit, wherein the signal contains an amount by which the limit is exceeded by the headroom voltage (SR), and wherein the limit is configured to be stored in the detection circuit.

15. A control method for a circuit arrangement, the circuit arrangement comprising:
an input for inputting a mains power,
an output with a positive output connection and a negative output connection for operating a load with an output current and an associated output voltage,
a first clocked converter with a SELV barrier between its primary side and its secondary side for generating a converter output current to generate an intermediate circuit voltage with a ripple on the secondary side and for controlling it to an adjustable mean value of the intermediate circuit voltage,
wherein the circuit arrangement is designed to control the first clocked converter such that the mean value of the intermediate circuit voltage is configured to follow the output voltage with a distance corresponding to the headroom voltage,
a post-regulator connected downstream of the first clocked converter for regulating the ripple on the intermediate circuit voltage generated by the first clocked converter,
a first optocoupler for transmitting information from the primary side to the secondary side via a current setpoint of the output current,
a second optocoupler for transmitting information via a headroom voltage from the secondary side to the primary side to enable control of the intermediate circuit voltage by the first clocked converter, the headroom voltage corresponding to a potential difference between the negative output connection and a circuit ground,
exactly one control circuit on the primary side for controlling the circuit arrangement,
wherein the control circuit is designed for controlling the headroom voltage to a smallest possible value in order to set a power loss in the circuit arrangement and in the post-regulator to a minimum value and at a same time configured to maintain a ripple of the output current as low as possible,
wherein the method comprises:
receiving a signal from the control circuit,
controlling the first clocked converter to an intermediate circuit voltage according to a value of the signal,
transmitting the setpoint of the output current via the first optocoupler to the post-regulator,
regulating the ripple of the intermediate circuit voltage and controlling the output current of the circuit arrangement by the post-regulator,
transmitting the signal from the detection circuit to the control circuit.

16. The control method according to claim 15, wherein a minimum of the headroom voltage is in a range from approximately 0.0V to approximately 0.5V, and wherein a swing of the headroom voltage is in a range from approximately 1V to approximately.

17. The control method according to claim 15, wherein a minimum of the headroom voltage is in a range from approximately 0.0V to approximately 10V and wherein a swing of the headroom voltage is in a range from approximately 2V to approximately 12V.

18. The control method according to claim 15, wherein the control circuit is configured to measure a temperature of the circuit arrangement, and configured to reduce the intermediate circuit voltage when the measured temperature exceeds a predetermined temperature.

* * * * *